Aug. 7, 1956

H. V. KINDSETH 2,757,894

BAG FILLING MACHINE GRAVITY PACKER

Filed Sept. 29, 1950

INVENTOR.
HAROLD V. KINDSETH
BY Paul, Paul & Moore
ATTORNEYS

Aug. 7, 1956  H. V. KINDSETH  2,757,894
BAG FILLING MACHINE GRAVITY PACKER
Filed Sept. 29, 1950  19 Sheets-Sheet 2

INVENTOR.
HAROLD V. KINDSETH
BY Paul, Paul & Moore
ATTORNEYS

INVENTOR.
HAROLD V. KINDSETH
BY Paul, Paul & Moore
ATTORNEYS

INVENTOR.
HAROLD V. KINDSETH
BY Paul, Paul & Moore
ATTORNEYS.

Aug. 7, 1956  H. V. KINDSETH  2,757,894
BAG FILLING MACHINE GRAVITY PACKER
Filed Sept. 29, 1950  19 Sheets-Sheet 6

INVENTOR.
HAROLD V. KINDSETH
BY
Paul, Paul & Moore
ATTORNEYS

Aug. 7, 1956

H. V. KINDSETH 2,757,894

BAG FILLING MACHINE GRAVITY PACKER

Filed Sept. 29, 1950

INVENTOR.
HAROLD V. KINDSETH
BY
Paul, Paul & Moore
ATTORNEYS

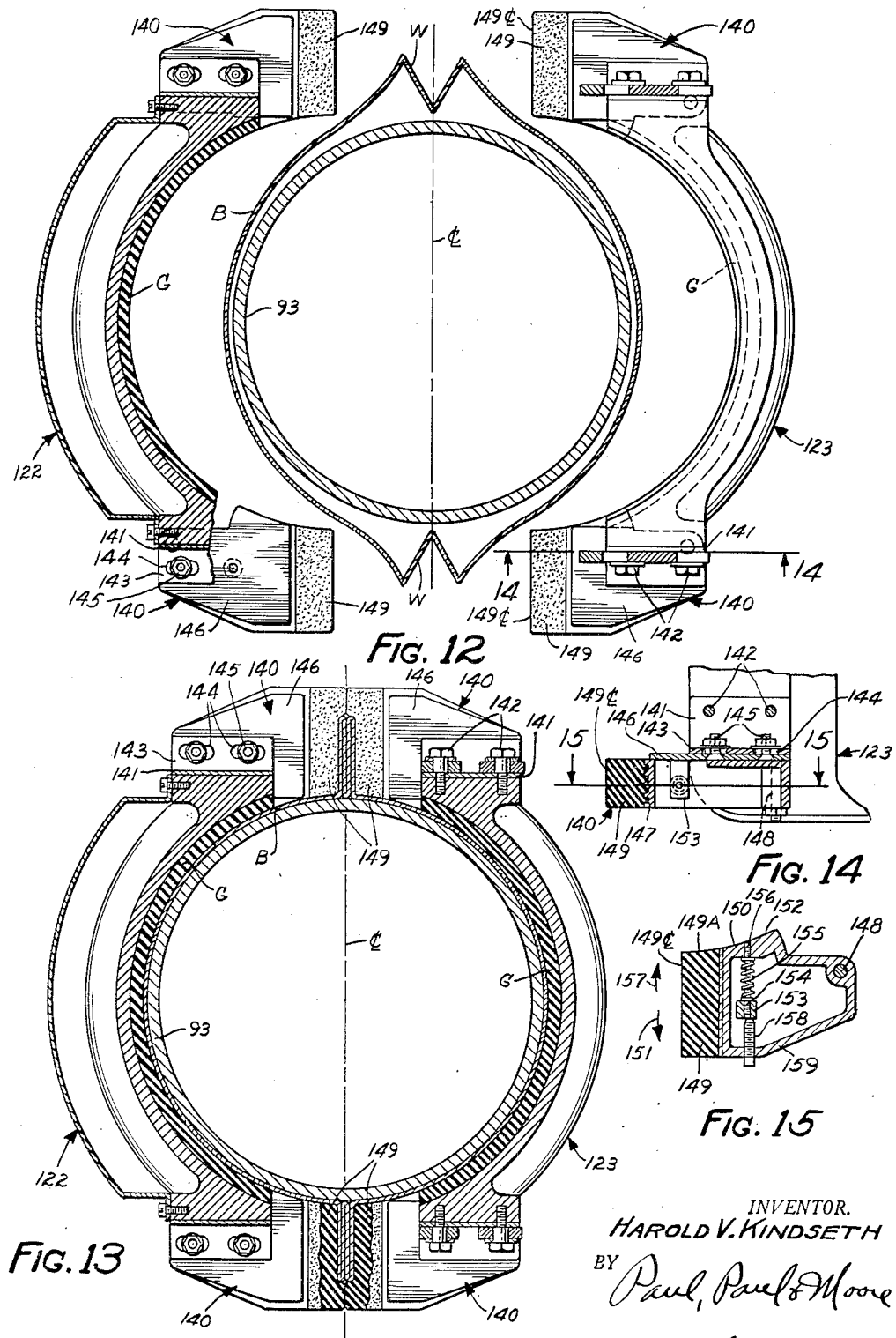

Aug. 7, 1956   H. V. KINDSETH   2,757,894
BAG FILLING MACHINE GRAVITY PACKER
Filed Sept. 29, 1950   19 Sheets-Sheet 12

INVENTOR.
HAROLD V. KINDSETH
BY Paul, Paul & Moore
ATTORNEYS

INVENTOR.
HAROLD V. KINDSETH

INVENTOR.
HAROLD V. KINDSETH
BY Paul, Paul & Moore
ATTORNEYS

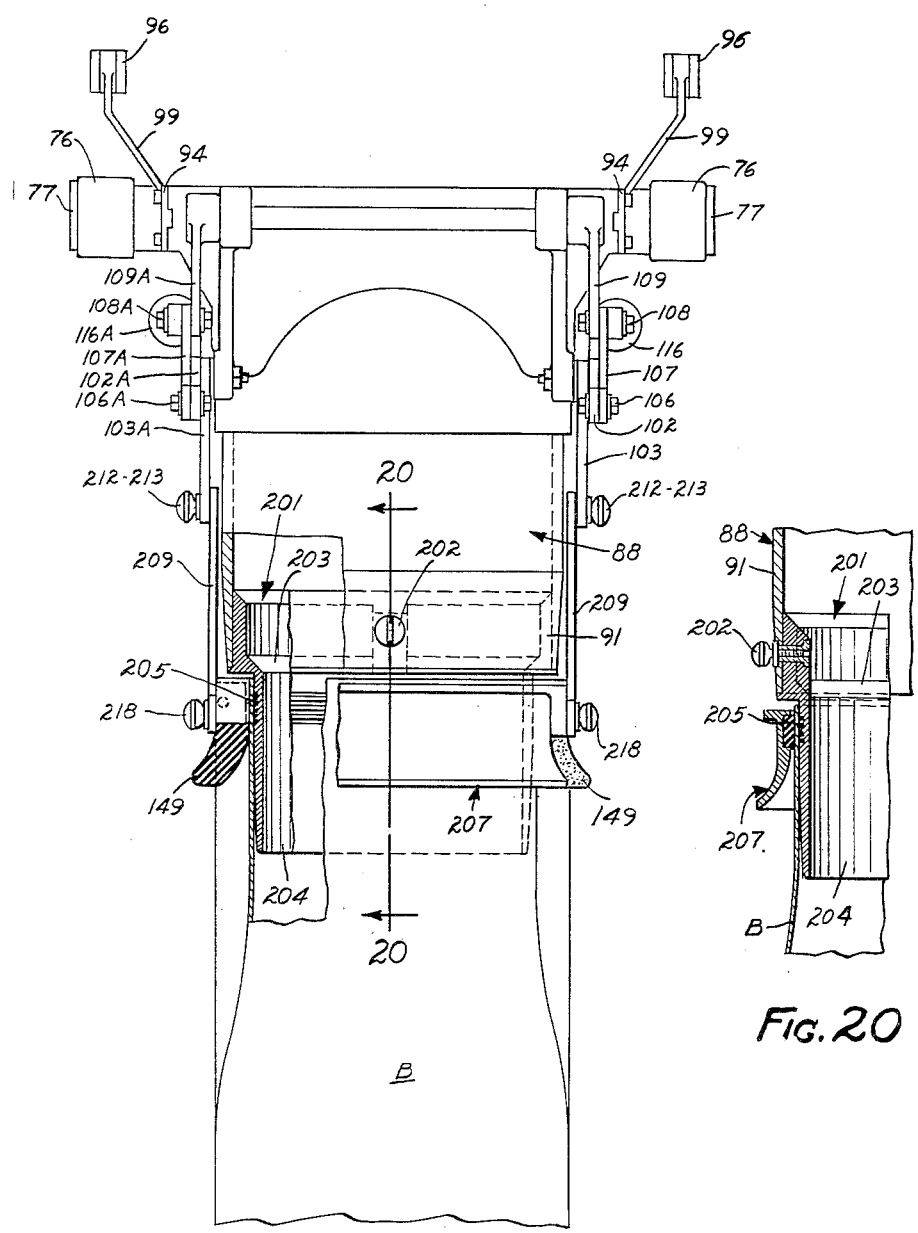

Aug. 7, 1956

H. V. KINDSETH 2,757,894

BAG FILLING MACHINE GRAVITY PACKER

Filed Sept. 29, 1950

INVENTOR.
HAROLD V. KINDSETH
BY Paul, Paul & Moore
ATTORNEYS

Aug. 7, 1956  H. V. KINDSETH  2,757,894
BAG FILLING MACHINE GRAVITY PACKER
Filed Sept. 29, 1950  19 Sheets-Sheet 18

INVENTOR.
HAROLD V. KINDSETH
BY
Paul, Paul & Moore
ATTORNEYS

Aug. 7, 1956  H. V. KINDSETH  2,757,894
BAG FILLING MACHINE GRAVITY PACKER
Filed Sept. 29, 1950  19 Sheets-Sheet 19

INVENTOR.
HAROLD V. KINDSETH
BY
Paul, Paul & Moore
ATTORNEYS

United States Patent Office 2,757,894
Patented Aug. 7, 1956

2,757,894

BAG FILLING MACHINE GRAVITY PACKER

Harold V. Kindseth, Minneapolis, Minn., assignor to Bemis Bro. Bag Company, Minneapolis, Minn., a corporation of Missouri Application September 29, 1950, Serial No. 187,456

18 Claims. (Cl. 249—17)

This invention relates to improvements in bag filling machines and more particularly to machines which are used for filling cotton or paper bags of varying sizes and types with bulk materials, such as flour, sugar, feedstuffs, etc. These materials and many others are bulky, and in order to obtain a firm packing it is necessary to compact such materials by vibrating or bouncing. They are often packed in varying sizes and types of bags. Thereafter the bag must be conveyed away and closed in a sequence of operations.

Many bulk materials are dusty and some spillage or dusting through the bags, particularly where cotton bags are used, is bound to occur. Such spillage and dusting constitutes a nuisance. It is desirable to minimize the same and to provide for ready clean-up of what occurs.

For proper filling and handling it is desirable to support the bags externally during the filling operation.

It is an object of the present invention to provide an improved bag filling mechanism capable of filling bags of various sizes and types.

It is another object of the invention to provide a bag filling machine wherein support is provided for the bags during filling and the support then removed and the bag deposited directly down on a conveyor and then moved a short way by the conveyor for further sequential operations.

It is another object of the invention to provide a bag filling machine having automatic controls for carrying out operations of filling, compacting and conveying automatically, yet under supervisory operator control.

It is another object of the invention to provide an improved bag filling machine having means for gripping varying sizes of bags and for neatly and tightly holding them during filling and compacting, and to provide in such a machine cooperating supporting saddles for holding and supporting the bag, particularly during compacting of the material by bouncing or otherwise.

It is another object of the invention to provide a bag sewing machine stand with provisions for supporting several sewing heads for selective operation and to provide in such stand for ready adjustment to accommodate various sizes of bags.

Other and further objects of the invention are those inherent in the apparatus herein illustrated, described and claimed.

The invention is illustrated with reference to the drawings wherein corresponding numerals refer to the same parts and in which Figure 1 is a front elevational view of the entire mechanism of the invention;

Figure 3 is taken along the lines and in the direction of arrow 3—3 of Figure 2;

Figure 10:
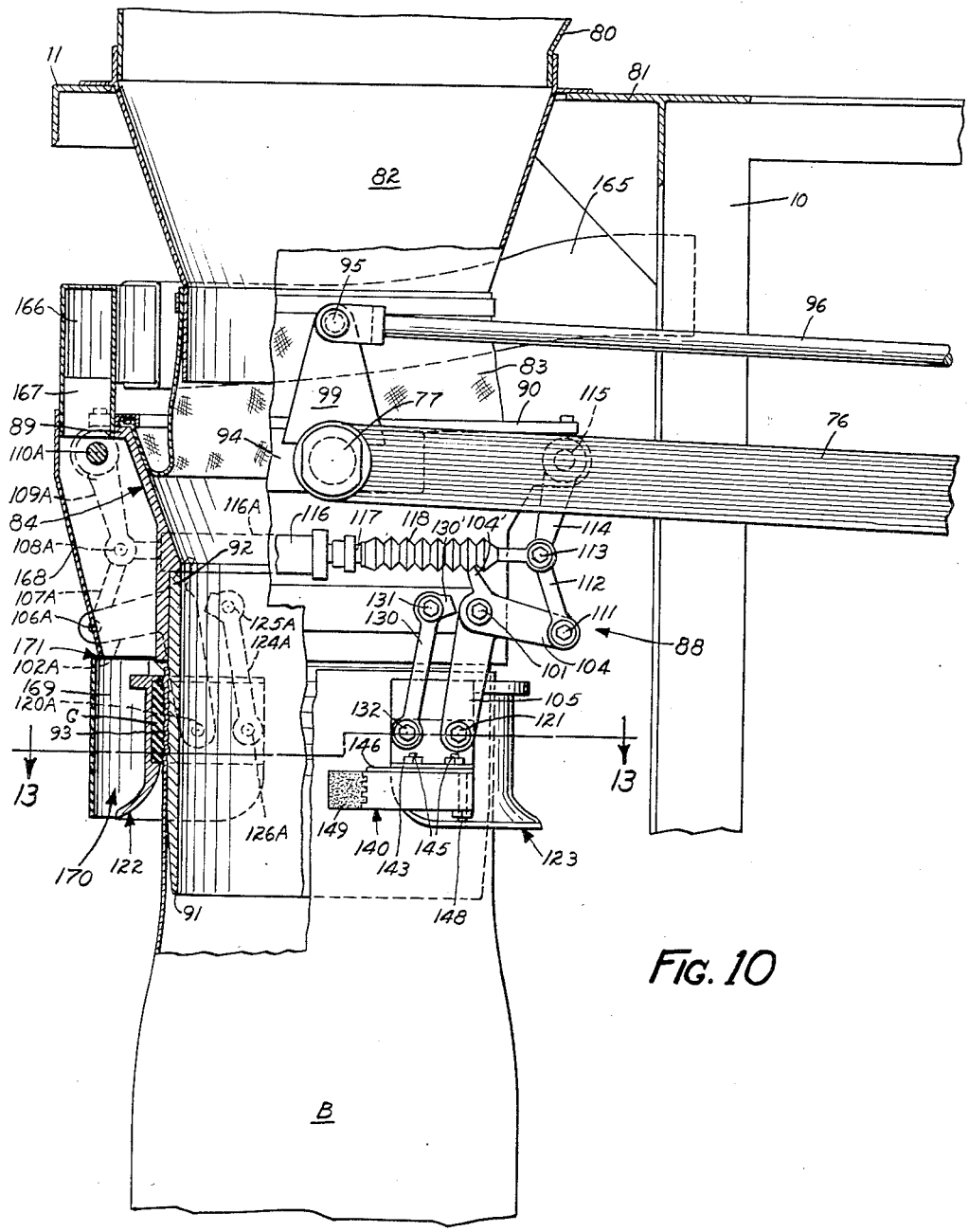
Figure 11:
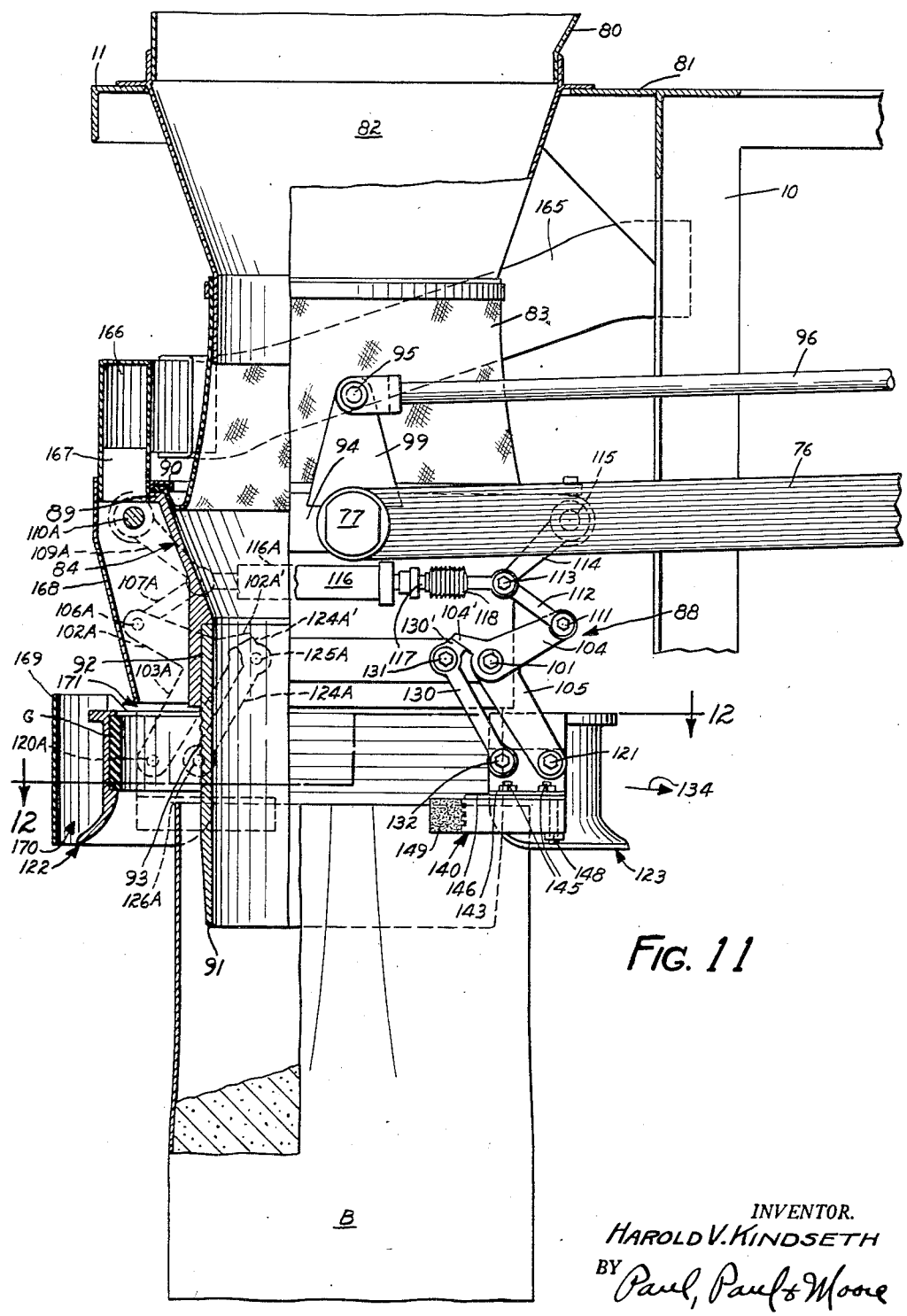
Figure 16:
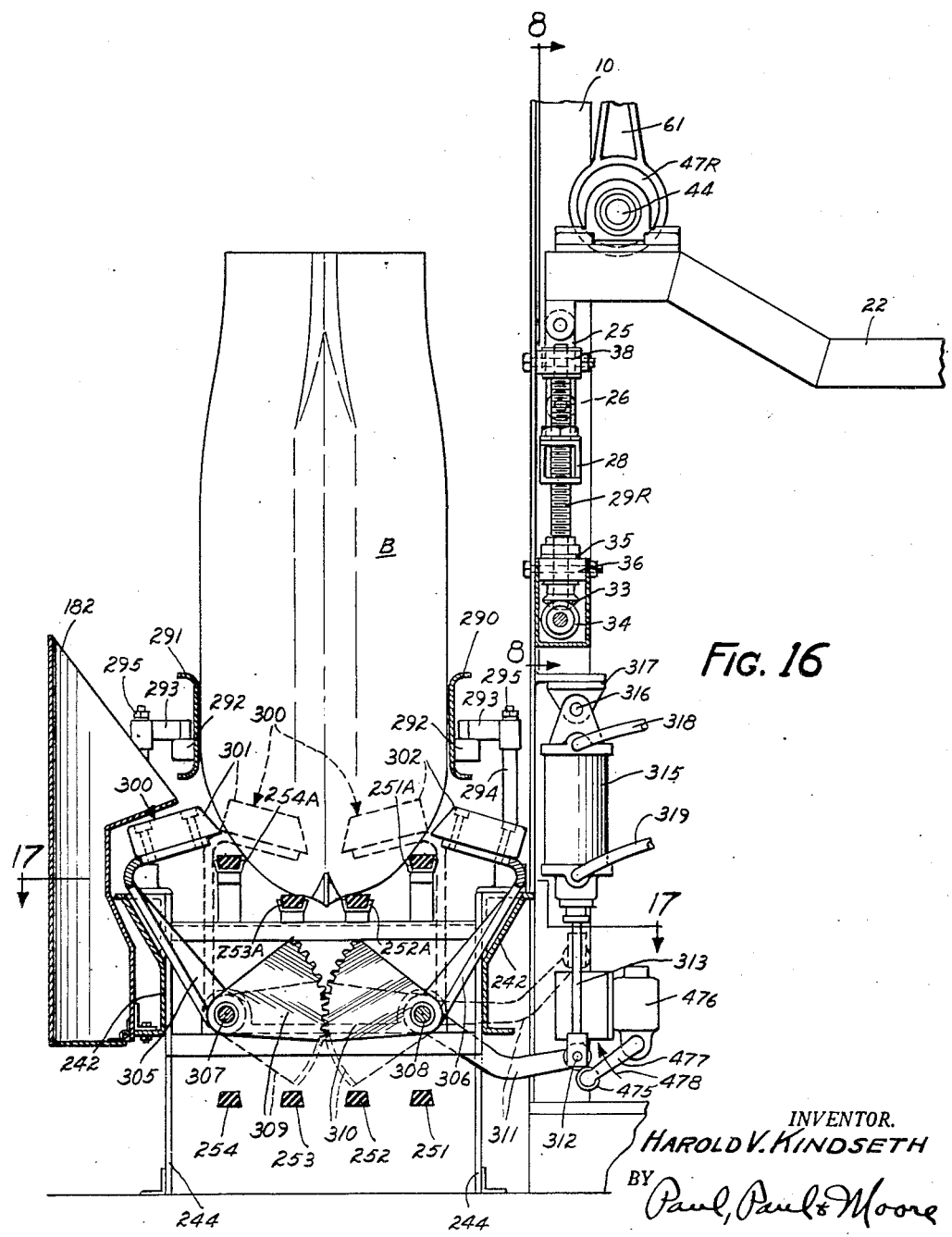
Figure 17:
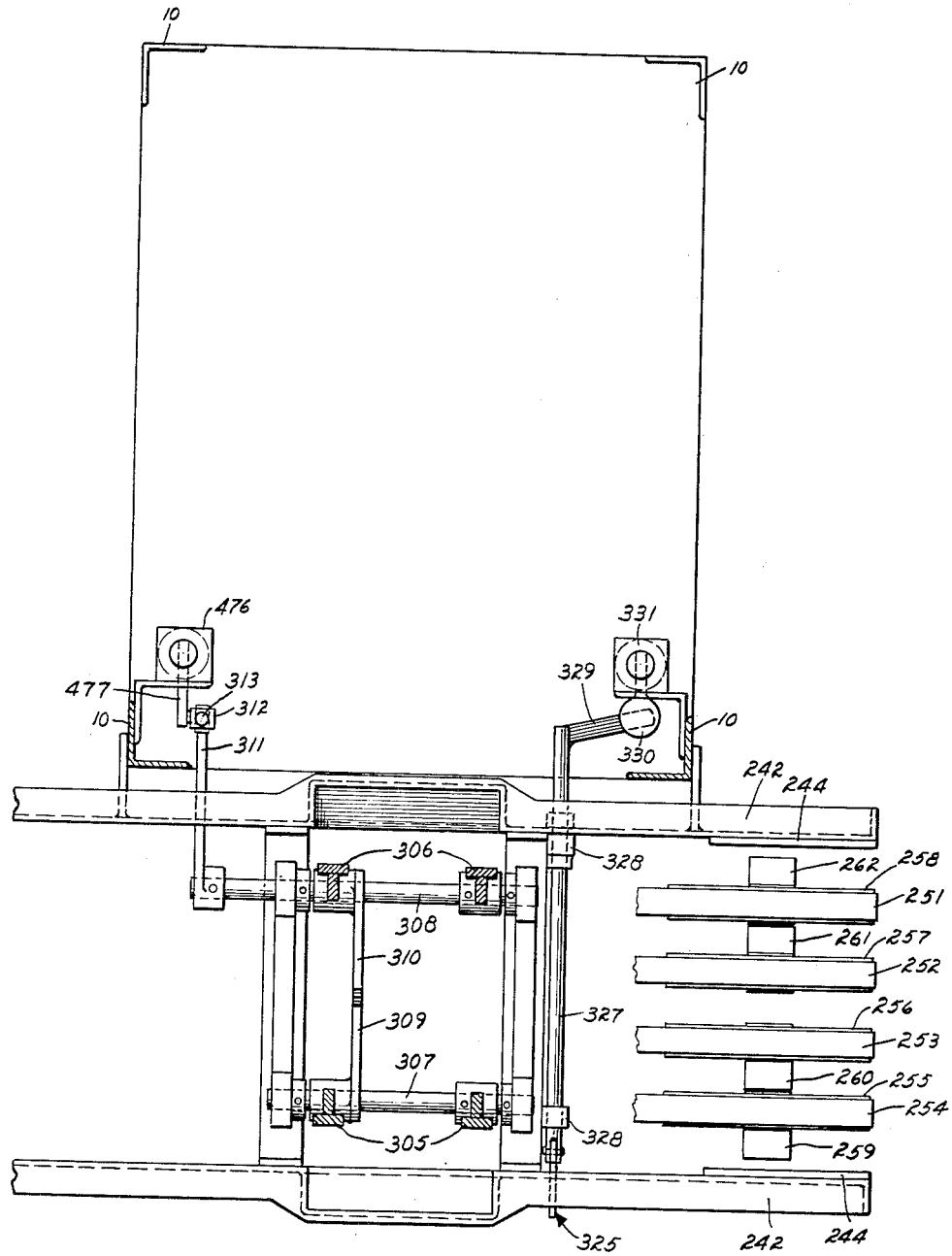
Figure 18:
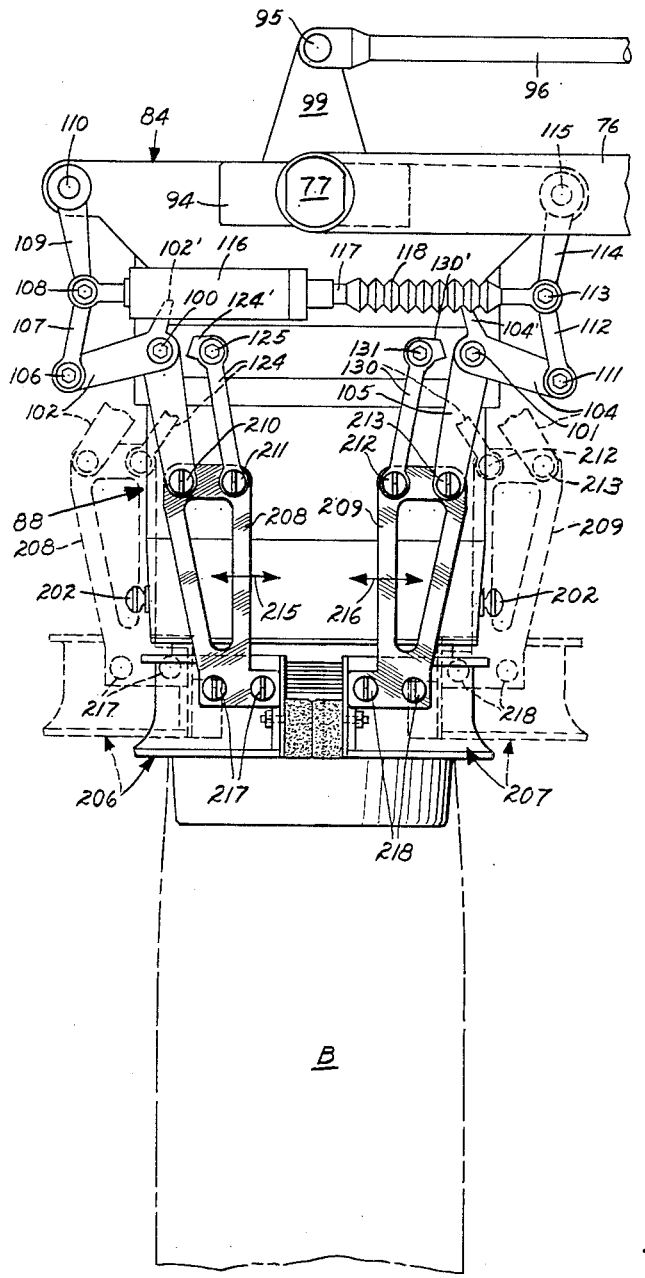
Figure 21:
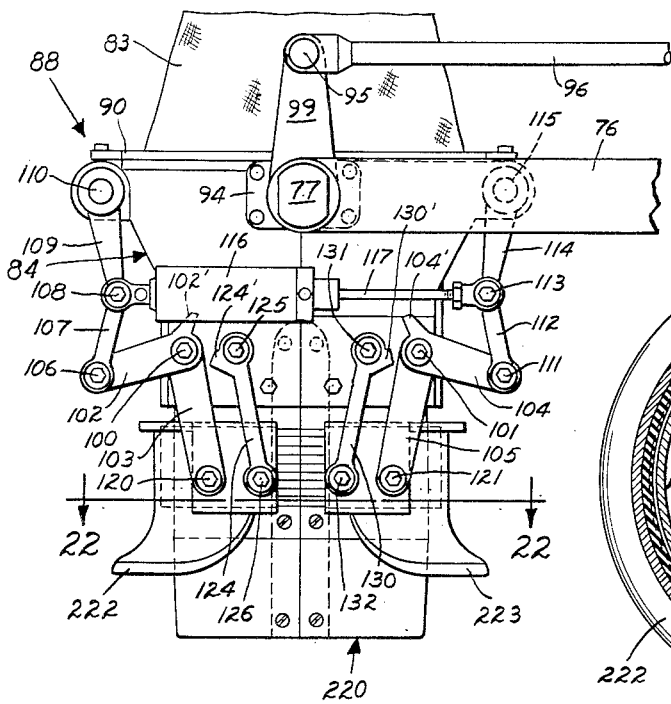
Figure 22:
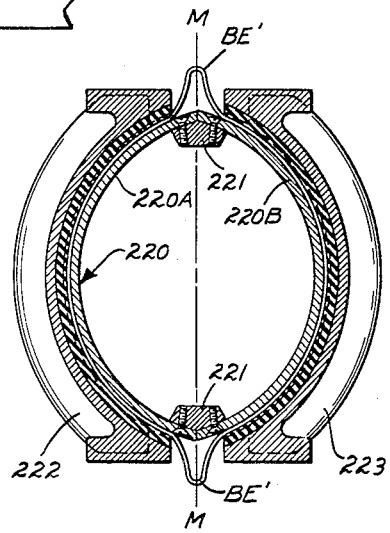
Figure 23:
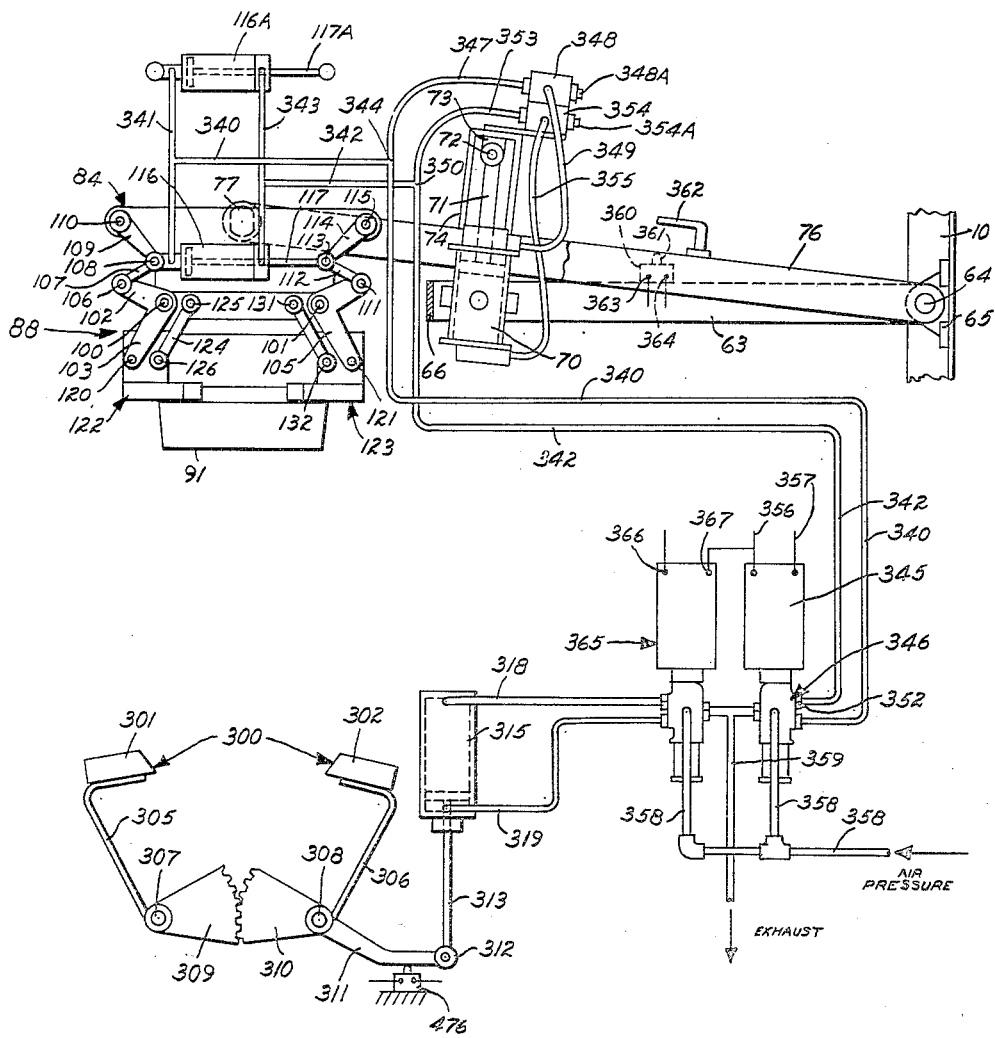
Figure 24:
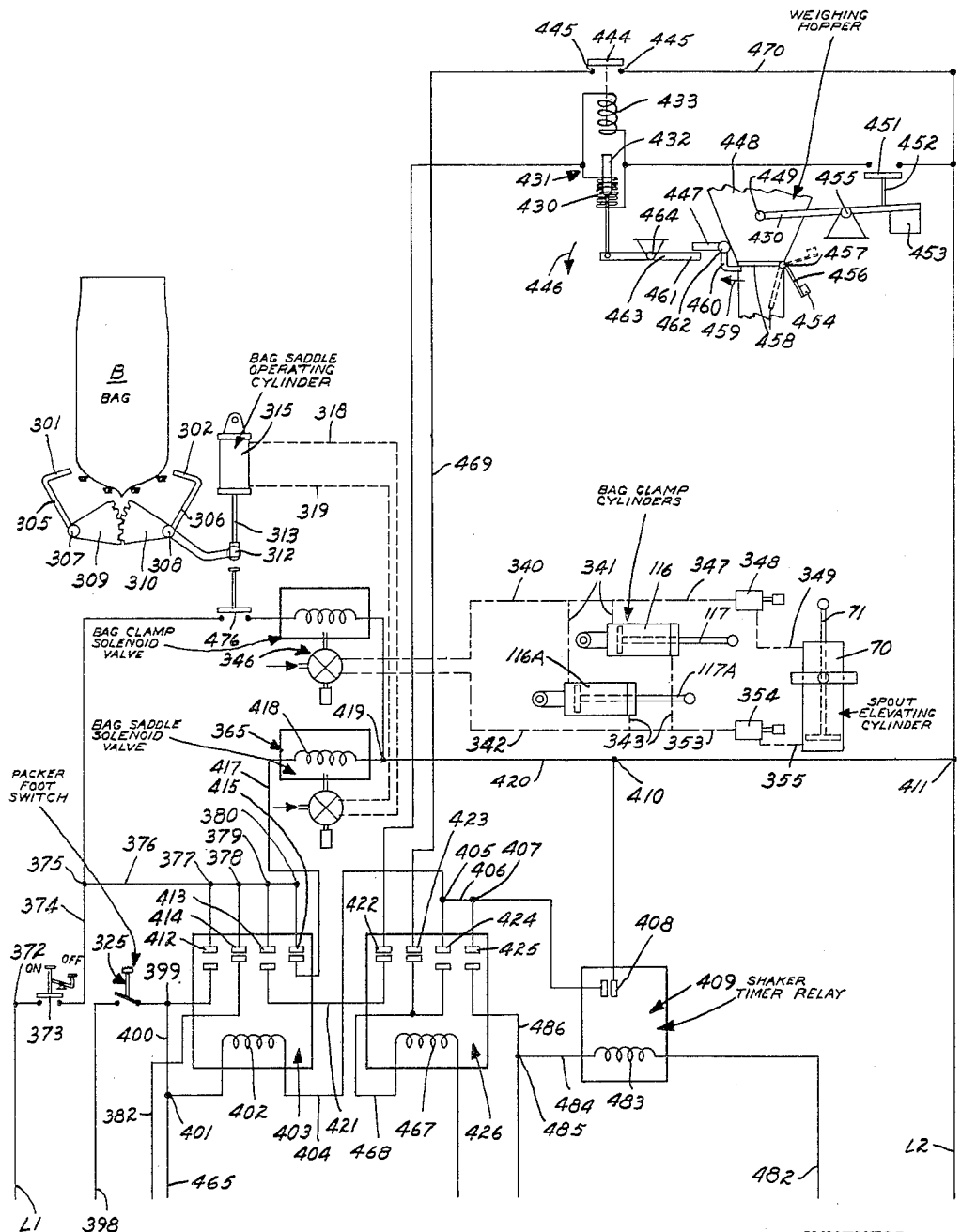
Figure 24A:
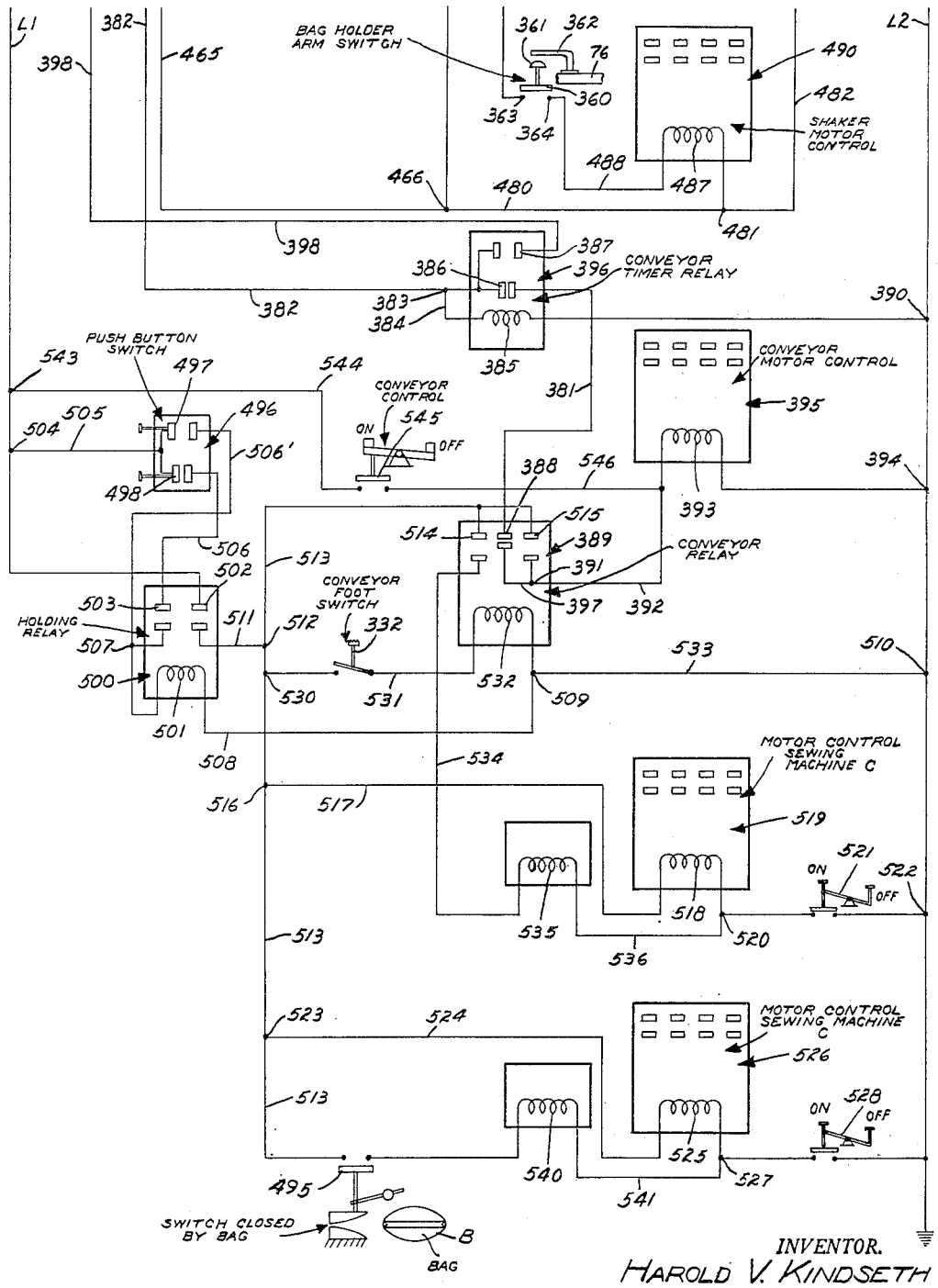

Figures 10 and 11 are both enlarged, fragmentary vertical sectional views of the spout and bag clamp mechanism. Figure 10 illustrates the spout with the bag thereon and with the bag clamp in clamping position and the bag about to be filled. Figure 11 illustrates the same apparatus, but with the bag filled and with the bag clamp moved to unclamping relation, just prior to elevation of the bag spout and clamping device to the position of Figure 6 in which the spout and clamp clear the upper edge of the bag;

Figure 12 is an enlarged horizontal sectional view taken along the line 12—12 of Figure 11, and shows the clamping jaws and extension for clamping a folded-type paper bag but with the jaws and extensions in the unclamping position;

Figure 13 corresponds to Figure 12 and is a horizontal sectional view taken along the line and in the direction of arrows 13—13 of Figure 10. Figure 13 shows the bag clamp and the extension jaws in clamping position wherein its holds folded-type paper bag firmly clamped on the circular material spout of the machine as during filling;

Figure 14 is a detailed fragmentary vertical sectional view taken along the line and in the direction of arrows 14—14 of Figure 12;

Figure 15 is a detailed horizontal sectional view taken along the line and in the direction of arrows 15—15 of Figure 14;

Figure 16 is an enlarged vertical sectional view taken at the bag filling station showing some of the parts broken away and in section and with the bag saddle retracted so as to permit a filled bag to settle between vertical guides on the machine and onto the conveyor mechanism for movement of the filled bags to another station;

Figure 17 is an enlarged fragmentary horizontal sectional view taken along the line and in the direction of arrows 17—17 of Figure 16 illustrating further details of the bag saddle operated mechanism and controls;

Figure 18 is an enlarged vertical fragmentary view of the bag filling spout and clamp mechanism and corresponds with Figures 10 and 11, except that it shows extension arms on the bag spout and bag clamp for receiving a smaller size bag than that shown on Figures 10 and 11;

Figure 19 is an enlarged fragmentary side elevational view, partly in section, of the apparatus shown in Figure 18 and is taken along the line and in the direction of arrows 19—19 of Figure 18;

Figure 20 is a fragmentary sectional view taken along the line and in the direction of arrows 20—20 of Figure 19;

Figures 21 and 22 are, respectively, a vertical side elevational view and a horizontal sectional view, both fragmentary views, showing a modified form of the spout shape and bag clamp for receiving an elliptical cross section bag;

Figure 23 is a schematic view of certain air and electrical circuits of the apparatus;

Figures 24 and 24A together are a wiring diagram of the apparatus and include schematically certain of the mechanical and electrical apparatus.

Figure 1:
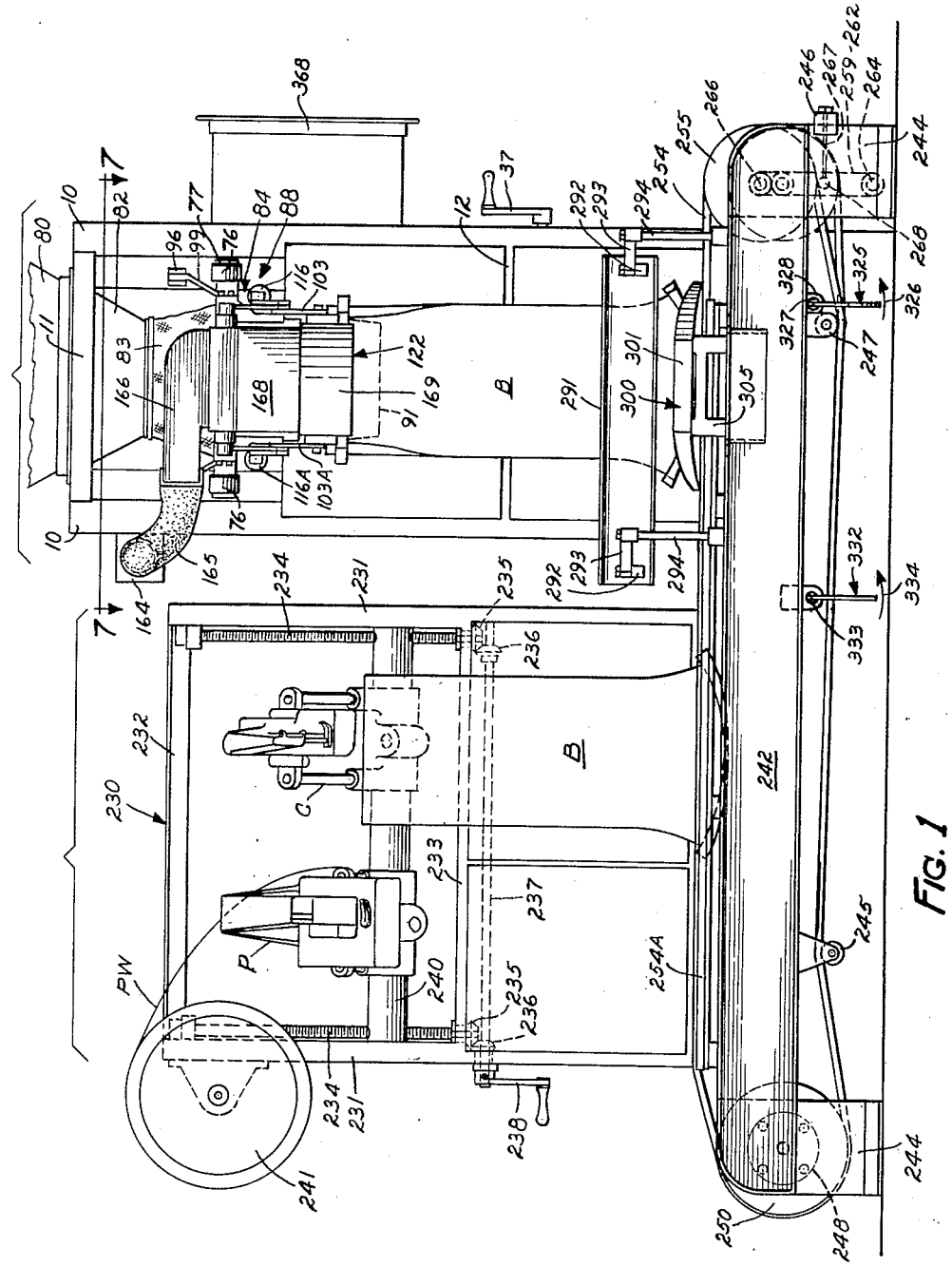
Figure 2:
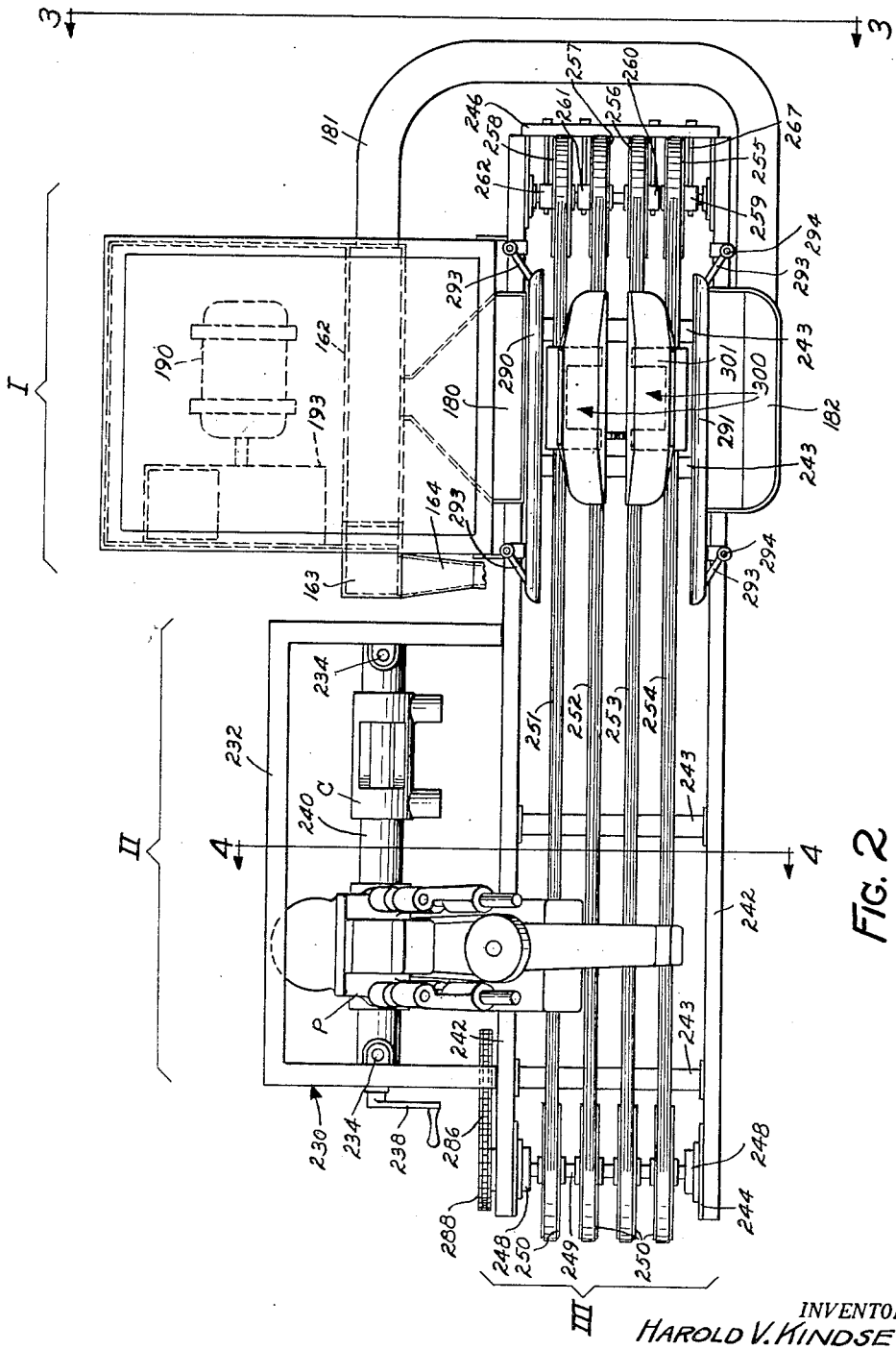
Figure 2 is a plan view of the apparatus of the invention.

Referring to the drawings, particularly Figures 1 and 2, the apparatus of the invention consists generally of three main parts, which are shown opposite the brackets I, II, III of Figure 2. Opposite the bracket I there is shown the bag filling station, which includes a material weighing, dumping and bag filling, together with apparatus for compacting the material in the bag, for supporting the bag while the material is compacted in it, and various accessory apparatus, including pneumatic clean-up device.

Opposite bracket II is shown the bag closure station, including sewing machines for closing the bag regardless of whether they are made of paper or fabric.

Opposite bracket III there is illustrated a conveyor mechanism which extends from station I to station II to a discharge end of the conveyor. At the bag filling station there is a vertical framework consisting of the posts 10—10 that are connected together at their upper and lower positions by the framing members 11 and 12.

*Bag filling and shaking mechanism*

Figure 3:
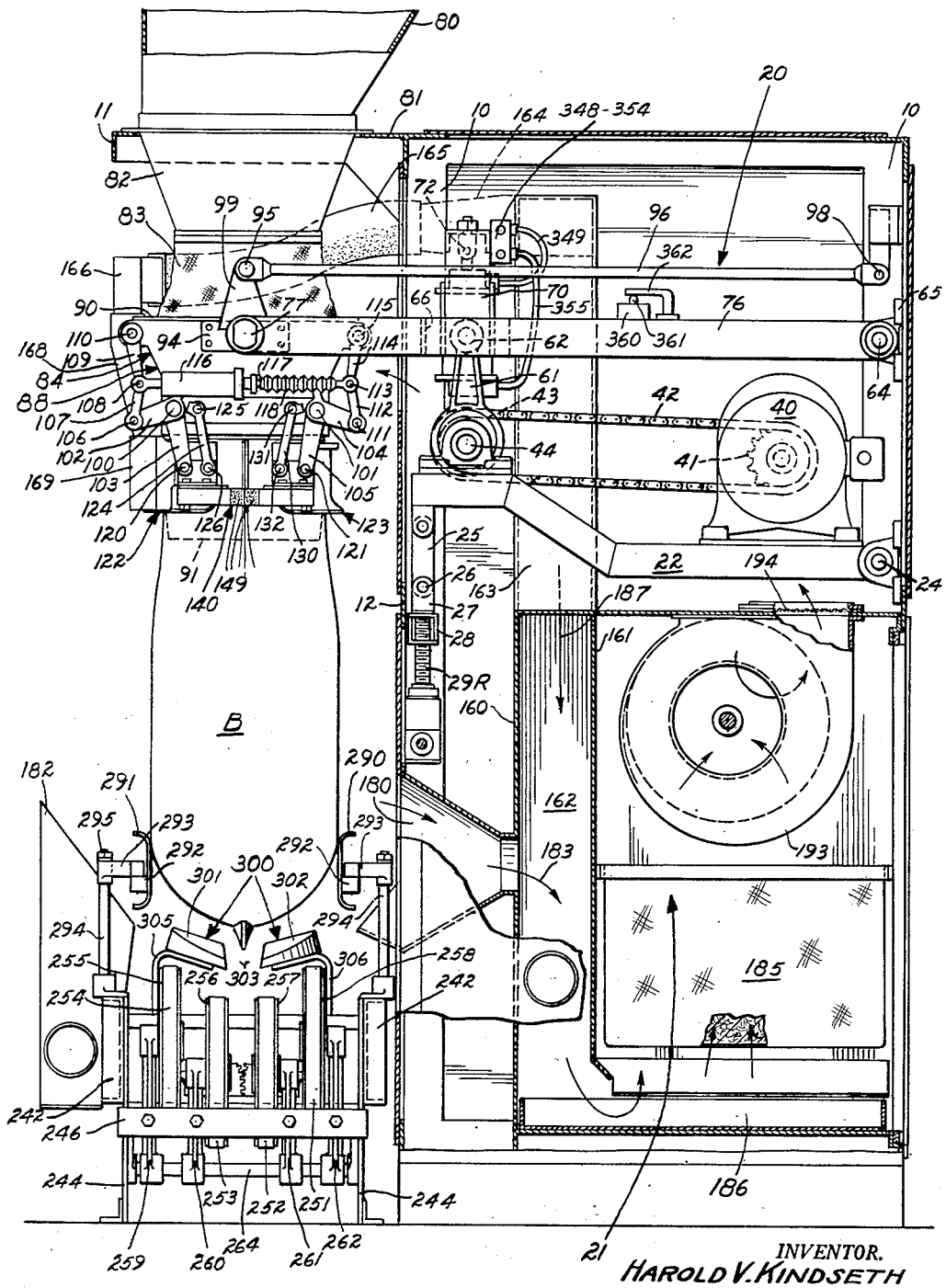
Figure 3 is an end elevational view with certain of the parts broken away and in section so as to show the internal details thereof.

Referring to Figure 3, within the framework there is provided at the upper part thereof a material compacting or shaker mechanism generally designated 20, while in the lower part of the framework there is provided a pneumatic material clean-up device or vacuum and filter system, generally designated 21.

The shaker mechanism 20 includes a pair of radius arms 22 that are pivotally supported on the rear cross-frame members at the pivot bearings which support the pivot pin 24.

The forward ends of the radius arms 22 are each connected by links 25—25 to pivots 26—26 on brackets 27—27, these brackets being in turn supported upon the vertically adjustable horizontal frame 28.

The frame member 28 is arranged to be moved vertically while still being maintained in a horizontal position by a pair of vertical screws 29L—29R that are connected so as to be rotated simultaneously by means of the gearing 30—31, shaft 32 and gearing 33—34. Shaft 32 is provided with a hand crank 37. The screws 29L—29R are provided with thrust bearings that are at 35—35, which are supported in the housings 36—36 of the gearing 30—31 and 33—34, respectively. The upper end of the screws 29L—29R are supported in the pivot blocks 38—38.

On opposite ends of the frame member 28 there are fastened the nuts 39L and 39R through which the screws 29L and 29R, respectively, operate. Accordingly, when the hand crank 37 is turned, this causes the rotation of the shaft 32, and through gearing 30—31 the left-hand screw 29L is turned and through the gearing 33—34 the right-hand screw 29R is turned. When screws 29L and 29R are thus rotated, the effect will be to raise or lower the nuts 39L—39R that are fixably attached to the bar 28 and consequently the bar 28 will be raised or lowered while being maintained always in a horizontal position. The effect of this is to raise or lower the front end of the radius rods 22—22 about the pivots 24. This raising and lowering adjustment is for varying the position of the bag spout and clamp mechanism for engaging the bags of varying vertical dimensions. Thus, when utilizing a 50-pound bag the spout must be set in one position and when utilizing a 100-pound bag the spout must be set in a prior position, as the bags are usually designed. Accordingly, the hand crank 37 permits this adjustment.

The radius arm 22 serves to support a shaker motor 40, which is provided with a sprocket 41 that is connected by a chain belt 42 to the sprocket 43 of the bag shaking mechanism. The sprocket 43 is on the bag shaker shaft 44, see Figures 3 and 8, which is in turn supported on bearings 45—45 on the front end of the radius rods 22, as shown in Figure 3.

The shaft 44 is of eccentric design and has an eccentric portion at 46R—46L for receiving eccentrically the eccentric adjustment rings 47R—47L. The shaft 44 is formed in this manner at each end and one of the ends is shown in section in Figure 8.

Along the center part 48 of the shaft there is milled a worm gear at 49 by means of which a housing 50 around the shaft may be rotated relative to the shaft for adjusting the amount of stroke of the shaker mechanism.

Near the center of housing there is provided a worm gear housing 51 having a removable cap 52 in which there is received a worm adjustment shaft and gear arrangement 53—54—55. The worm gear 54 mates with the gear 49 cut into shaft 48.

Both ends of the shaft 53 are provided with squared ends as at 55—55. A wrench may accordingly be applied to end 55 and when it is rotated this will cause the gear 54 to work around on gear 49 and will be rotated relative to the shaft 48. In this way the position of the housing 51 and hence of the tubular cover 50 of shaft 48 is held in any position in which the worm gear 49 mating with the worm gear 54 may have occasion to be stopped.

Figure 8:
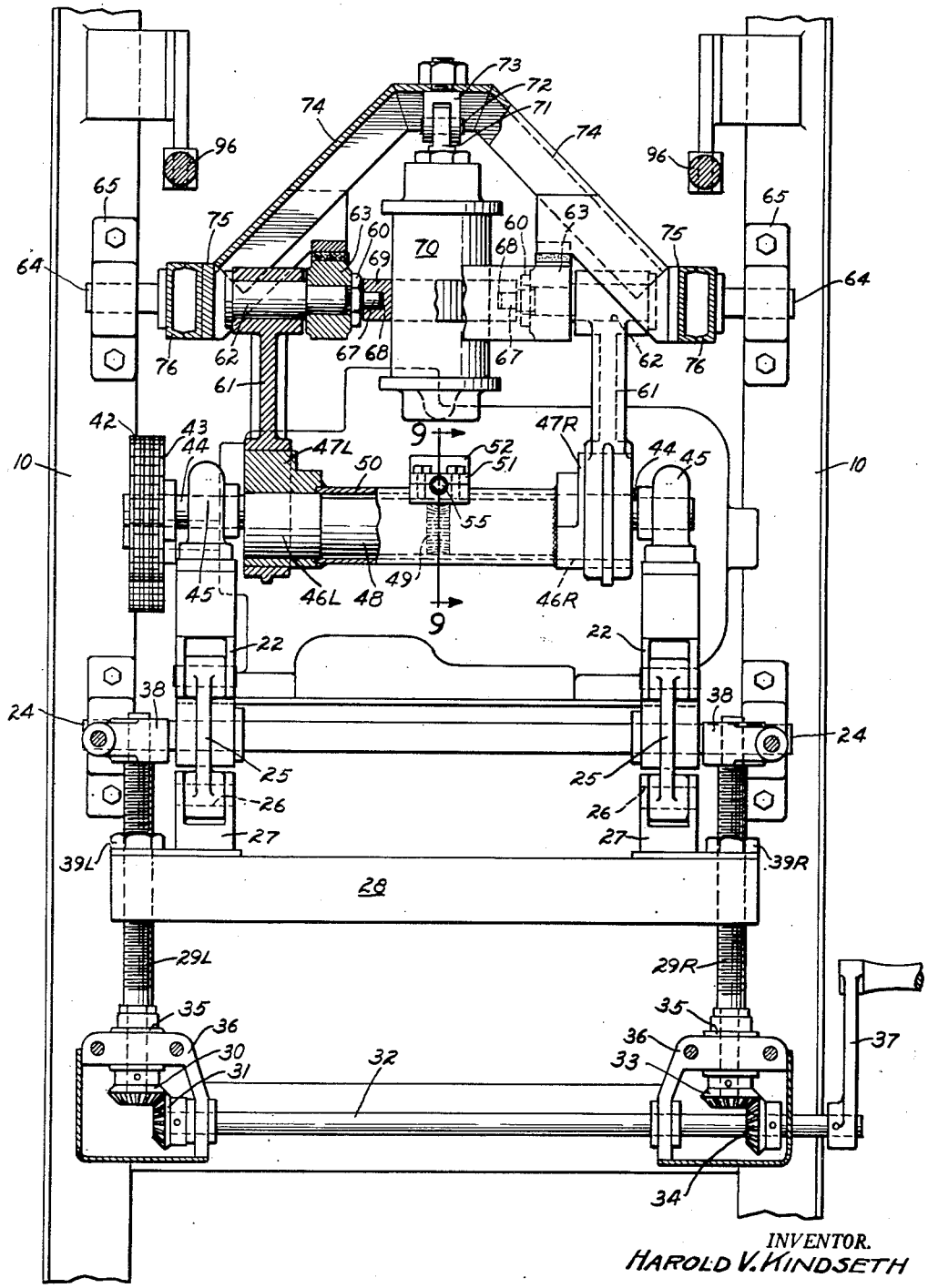
Figure 8 is an enlarged fragmentary vertical sectional view taken along the line and in the direction of arrows 8—8 of Figures 7 and 16, illustrating the bag elevating and settling mechanism.

At each end of the tubular cover 50 around shaft 48 there is provided an eccentric ring as at 47L for the left end, see Figure 8, and 47R at the right end. These eccentric rings are firmly attached to the tube 50 by welding, or other solid fastenings. The entire tube and eccentric ring assembly 47R—50—47L can be slipped onto the shaft 44—46R—46L—48 when the shaft is removed from the bearings 45 due to the fact that the eccentric portions 46R—46L are aligned and have a diameter which is in excess of that at 48, and also a diameter which is in excess of the gearing 49. Of course, gear 54 is at such time removed by lifting off cap 52.

The net effect of rotating the worm adjustment screw shaft 53—54—55 is to cause the eccentrics 47R and 47L to be turned with reference to the eccentric portions of shaft 44 in which they are mounted. Since the portions 46R—46L of the shaft 44 are themselves eccentric and the members 47R—47L are likewise eccentric, it follows that the rotation of such eccentric portions relative to each other will increase or decrease the net eccentricity of the outer eccentric rings 47L and 47R relative to the axis of rotation of the shaft 44.

The outer eccentric surfaces of rings 47L and 47R serve as the crank surfaces for the links 61—61 which extend from the eccentrics up to the stub shafts 62—62. The stub shafts 62—62 pass through the forward ends of a pair of upper radius rods 63—63 to which they are held by nuts 60—60. These radius rods 63—63 are pivotally connected to the main frame at rear pivot shaft 64 (Figure 6) which is in turn supported upon the pivot bearings 65.

Figure 6:
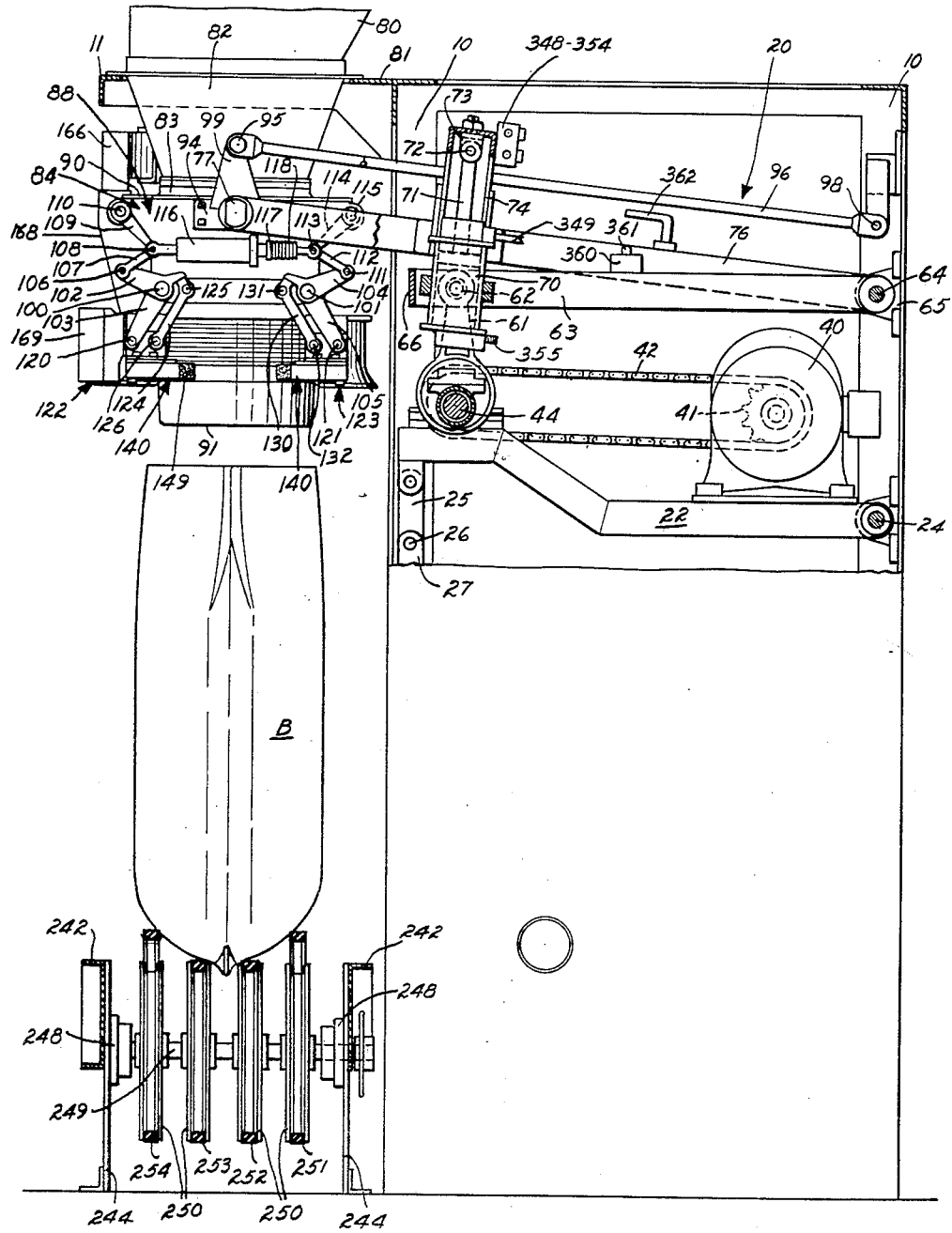
Figure 6 is a vertical sectional view corresponding to Figure 3, except that it shows the apparatus with the bag clamp in the unclamping position and the spout and bag clamp elevated so as to permit the bag to be carried along by the conveyor mechanism to another station.

The radius rods 63—63 preferably are made as one integral piece and are joined together by means of a front web 66, see Figure 6.

At the inner ends of the stub shafts 62—62 there is a reduced portion 67—67 which extends into bearing recesses 68—68 in the ring 69 that surrounds and is attached to the cylinder 70. The cylinder 70 is provided with a double action piston (not illustrated) and piston rod 71, which is pivoted at 72 to a bracket 73 carried at the mid-point of the reach frame 74—74 which extends down and is solidly joined at 75—75 to the forward mid-portion of the shaker arms 76—76. Cylinder 70 has two air inlet parts, as shown in Figure 23, so its piston may be held with air pressure (introduced appropriately through such parts) with the piston either fully extended (spout elevation) or fully retracted (as during shaking).

The shaker arms 76—76 are supported at their rear ends on the same pivot shaft 64 as serves pivotally to support the upper radius arms 63—63. When air is admitted to the lower part of the pneumatic cylinder 70, see Figure 23, the frame 74 is raised thus elevating the shaker arms 76, regardless of the position of the shaker mechanism 44—60. By simply admitting air to cylinder 70 the entire shaker arms can thus be raised and the bag filling and bag clamping mechanism thereby elevated very quickly and conveniently so as to lift it out of the way of the top of the bag which can then be moved sideways to the next station. During shaking operation air is admitted to the upper part of cylinder 70 which therefore holds piston rod 71 fully drawn in and accordingly in effect makes the cylinder 70 and piston rod 71 a link of fixed length between bearing recesses and pivot 72. Then when shaft 44 is rotated for shaking, the shaking forces are transmitted through pivot 72 to arms 75 and level to the spout.

The shaking mechanism is operated by motor 40 which through the chain belt 42 turns the sprocket 43 and consequently rotates the shaft 44. When the shaft 44 rotates it consequently rotates the eccentric 47L—47R, (the net eccentricity of which may be adjusted by turning shaft 53), and through the cranks 61—61 the shaking motion serves to move up and down the stub shafts 62—62 which are stabilized by the upper radius arms 63—63. These shafts 62—62 reach through arms 63—63 and move the ring 69 up and down by virtue of their pivotal connection in such ring 69 and since it may be assumed that the cylinder 70 is held retracted by introduction of air into the upper part thereof, such up and down shaking movement is communicated through the cylinder 70 and piston 71 to the frame 74 and hence to the shaker arm 76—76, which carries the material delivery spout which is adapted to have a bag attached thereto by a bag clamp.

Figure 9:
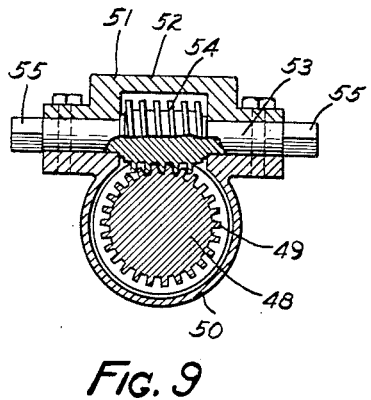
Figure 9 is an enlarged fragmentary vertical sectional view along the line and in the direction of arrows 9—9 of Figure 8.

For adjustment of the amount of shaker stroke it is only necessary to turn the adjusting shaft 53 by wrench applied to the squared ends 55—55, see Figures 8 and 9, as previously described. This changes the net eccentricity of the eccentric surfaces 47L and 47R and consequently the degree of shaking motion imposed upon the shaker arm 76—76 and spout.

Referring to Figures 3, 10, 11 there is illustrated a material hopper at 80 which is supported on the bracket 81 that is a forward extension of the frame 10—10 of the filling mechanism I. Below the hopper there is a funnel-shaped connection 82 which is connected by the fabric sleeve 83 to a spout generally designated 84. The sleeve 83 is attached to the upper flange of the cone shaped portion 89 of the spout by means of an enclamping ring 90. Below the cone-shaped portion 84 of the spout there is a cylindrical sleeve portion at 91 that is removably attached to the cone by the press fit at 92. The outer surface at 93 of the sleeve 91 is ribbed circumferentially so as to provide a better grip surface against which the bag clamp mechanism, to be described, is adapted to operate.

The forward ends of the shaker arms 76 are provided with pivots 77 that are fastened to attachment plates 94 on opposite sides of the upper conical shaped portion 89 of the spout. The attachment plates 94 on each side of the spout also have an upwardly extending gusset 99 which provides points of attachment for pivot pins 95, the pivot pins being connected by the stabilizing arms 96 which in turn extend back and are supported by pivots 98 on the rear frame of the shaker mechanism. As shown in the plan view, Figure 7, the supporting liners, arms, pivots, etc. on one side of the spout are duplicated on the opposite side. It will thus be seen that the shaker arms 76 and the stabilizer arms 96, both being pivotally supported at 64 and 98, respectively, at the rear part of the frame of the machine, form a parallelogram of motion of which one side is the side composed of plate and gusset 94—99 carrying the pivots 77 and 95. The plate and gusset 94—99 and hence spout 84 are accordingly always maintained vertical regardless of the degree of vertical oscillation. Accordingly, when the shaker arms 76 are oscillated up and down during their shaking motion, as previously described, the entire spout mechanism generally designated 88 is likewise oscillated up and down relative to the hopper 80, the flexible sleeve 83 meanwhile permitting the material to flow down from the hopper to the spout without opening to the atmosphere due to the flexibility of the sleeve.

*Bag clamping mechanism*

The bag clamping mechanism is best seen in Figures 1, 3, 6, 10, 11 and 12 through 15. The clamp is essentially a two-part clamp which works against spout portion 93, the levers, bell-cranks, pistons, etc. for supporting and operating the clamps being duplicated on opposite sides of the spout. The mechanism is as follows:

The spout is provided with pivots at 100 and 101 upon which the bell crank levers 102—103 and 104—105 are pivoted. The portion 102 of the bell crank lever is pivotally connected at 106 to a link 107 that is in turn pivoted at 108 to the link 109, the latter being pivoted at 110 to the spout mechanism. Links 107 and 109 form a toggle. Likewise, portion 104 of bell crank lever 104—105 is pivoted at 111 to the link 112, which is in turn pivoted at 113 to the link 114 that is again pivoted at 115 to the spout mechanism links 112 and 114 form a toggle mechanism. The pivots 108 and 113 are arranged to be pushed apart by the cylinder 116 and cooperating piston rod 117, the base of cylinder 116 being pivoted to 108 and piston rod 117 is pivoted to 113, the piston rod being covered over with a flexible protector 118. When the cylinder 116 has air injected into it the piston rod 117 pushes out upon the pivot 113, the bottom pivot of the cylinder 116 which is connected to the pivot 108 meanwhile pushing that pivot outwardly also. The piston 117 is retracted by a spring, not illustrated, within cylinder 116.

The links 107—109 act as a toggle, as do also the links 112—114. Accordingly, when these toggles 107—109 and 112—114 are pushed toward their straightening position relative to the line between pivots 106—110 and 111—115, a powerful pushing action is exerted downward upon the lever arms 102 and 104, respectively. This powerful levering action is utilized in the mechanism for moving the bag clamping heads towards the ribbed portion 93 of the sleeve 91 for bag clamping.

The lower ends of the bell-crank lever portions 103 and 105 are pivoted at 120 and 121 to the bag clamping members generally designated 122 and 123, respectively. Parallel to the portion 103 of the bell crank 102—103 there is a supporting link at 124 which is pivoted to the spout mechanism at 125 and to the bag clamp mechanism at 126. This link is shaped at its upper end so as to form a stop for movement in the bag unclamping direction, as seen in Figure 11. The link 124 and portion 103 of the bell crank accordingly act as a parallelogram of motion and maintain the bag clamping member 122 level regardless of whether it is in clamping position or retracted position. Similarly, parallel to the portion 105 of the bell crank 104—105 there is a stabilizing lever 130 which is pivoted to the spout at 131 and pivoted to the bag clamp at 132. It acts similarly to stabilize and maintain level the bag clamp 123.

In Figure 3 the bell crank stabilizing levers, toggles and piston-cylinder arrangements for their operation is shown for one side of the spout-clamp. It will be understood that precisely the same arrangement is provided on the opposite side of the spout for carrying and operating that end of the clamp. Accordingly, there are two pistons, two piston rods, 4 toggles, 4 bell cranks and 4 stabilizing levers in the arrangement. Some of these are illustrated in Figures 10 and 11. Where the parts on the opposite side of the spout are shown in dotted lines in the several figures, these are designated by the numeral used to designate the near side part plus the subscript "A."

It will be understood, therefore, that there are two cylinders 116 and 116A (Figure 23) and all the associated mechanisms for operating the one set of bag clamps 122—123 and that air is simultaneously injected into those two cylinders 116 and 116A for operating the bag clamps 122 and 123. Cylinder 116 is shown in full lines in Figure 11 and the corresponding cylinder on the far side, designated 116A, is shown in the dotted lines. The latter is also shown in Figure 23.

It will be noted from Figure 11, particularly, that the bell crank portion 104 is provided with a protuberance at 104′ which fits against a cooperating protuberance 130′ on the links 130 which was a stop for the mechanism limiting the outward travel of the clamp 123 in the direction of the arrow 134. Similar protuberances serve to limit the opening travel of the clamp 122.

In Figures 12, 13, 14 and 15 there is illustrated one pattern of spout and bag clamping jaws that is used for a large size of folded paper bags and for cloth bags. Thus, the spout portion 93 of circular cross section has around it in Figure 12 a paper bag B which is infolded at W—W. The clamp 122 has a soft rubber cushion G which extends around a considerable arcuate segment of tube 93. The bag clamp 123 is similar to 122 and when the two bag clamps 122 and 123 are drawn together by the action of the cylinders 116—116A, the associated toggles and bell crank mechanism, the clamps will assume the position shown in Figure 13.

Upon each of the clamps generally designated 140 there is mounted an auxiliary clamping mechanism for engaging and tightening the fold portions W—W of the bags mounted on the spout 93. All of the clamps 140 are similar in construction and therefore only one need be described. The clamps 140 are mounted on brackets 141 which are held in place on the clamps 122 and 123 by screws 142—142. The horizontal flange 143 of the bracket 141 is slotted at 144—144 to receive the bolts 145—145 by means of which the supporting plate 146 of the clamp 140 is attached.

By loosening the bolts 145 the plate can be slid along in the slots 144 for varying the adjustment of the auxiliary clamp 140 relative to the main clamp 122 and 123. The plate 146 is provided with a pivot at 148 upon which a member 150 is adapted pivotally to move back and forth in the direction of the arrows 151 and 157. The member 150 is provided with an arcuate surface 152 which follows the contour of the bag as placed upon the filling spout 93 and is also provided with a pad of soft rubber 149, which is vulcanized into 147, as shown in Figure 14. The plate 146 is provided with a downwardly extending rib 153 through which the screw 154 is threaded so as to serve to locate one end of the spring 155, the other end of the spring being located by the screw 156 in the member 150. The spring 155 is a compression spring, and accordingly tends to move the member 150 in the direction of arrow 157, which is to say, in bag clamping direction (toward the spout 93). Movement away from the spout is opposed by the reaction of compression of the spring 155.

The movement toward the spout is adjusted by means of the screw 158 which passes through the side wall 159 of the member 150. When member 150 is swung, the screw 158 is brought against the rib 153, which is stationary upon the plate 146. The clamping pads 149 conform to the contour of the spout along portion 149A and then follow the surface of a diametrical longitudinal dividing plane along the center line CL of the spout. This surface is 149CL on the soft rubber pad of the auxiliary clamping mechanism. The effect of this construction is that the surfaces 149A and 149CL of each of the auxiliary clamps, being urged toward the spout by springs 155, produces a stretching action on the bag adjacent folds W—W as the clamp jaws 122—123 approach their final clamping position. This action serves to stretch the bag B tightly around the spout 93 and when the clamps are in the final clamping position the compression of the rubber pads 149 upon the folds W serves to bring the folds to the position shown in Figure 13, tightly closed against the loss of material at the spout.

Referring again to Figure 3, in the lower part of the machine frame there is provided a motor-driven vacuum fan and filter arrangement for cleaning in the vicinity of the bag filling and packing station I. This vacuum device consists of a chamber 160, having an inner chamber wall 161 which provides a manifold 162 into which the duct 163 extends from the upper part of the machine.

Figure 5:
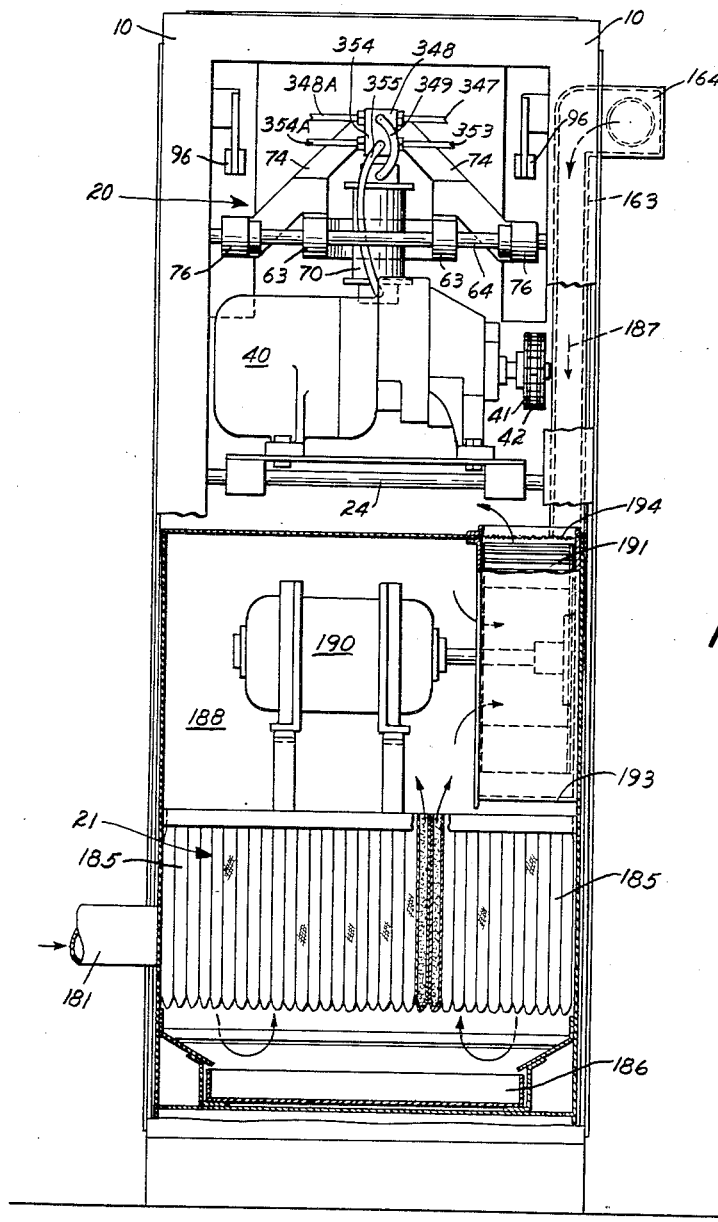
Figure 5 is a rear view, partly broken away and in section, showing particularly the suction apparatus for the collection of extraneous dust and spillage.

It will be noted from Figure 3 that the duct 163 extends up and then out as shown in Figure 5, where it is joined at 164 to a flexible connector 165 which extends to a curved air entrance nozzle 166 on the spout mechanism.

Referring to Figures 10 through 13, particularly, it will be noted that the flexible spout 165 connects to the curved inlet nozzle 166, which is open at the bottom 167 and is connected through the downwardly contoured portion 168 to a housing portion 169 on the front of the machine. Air which may be laden with dust enters the inlet nozzle, as indicated by arrows 170, 171 and flows into the ductwork and thereby carries away any dust which happens to be in the atmosphere adjacent to the filling spout 122.

Figure 7:
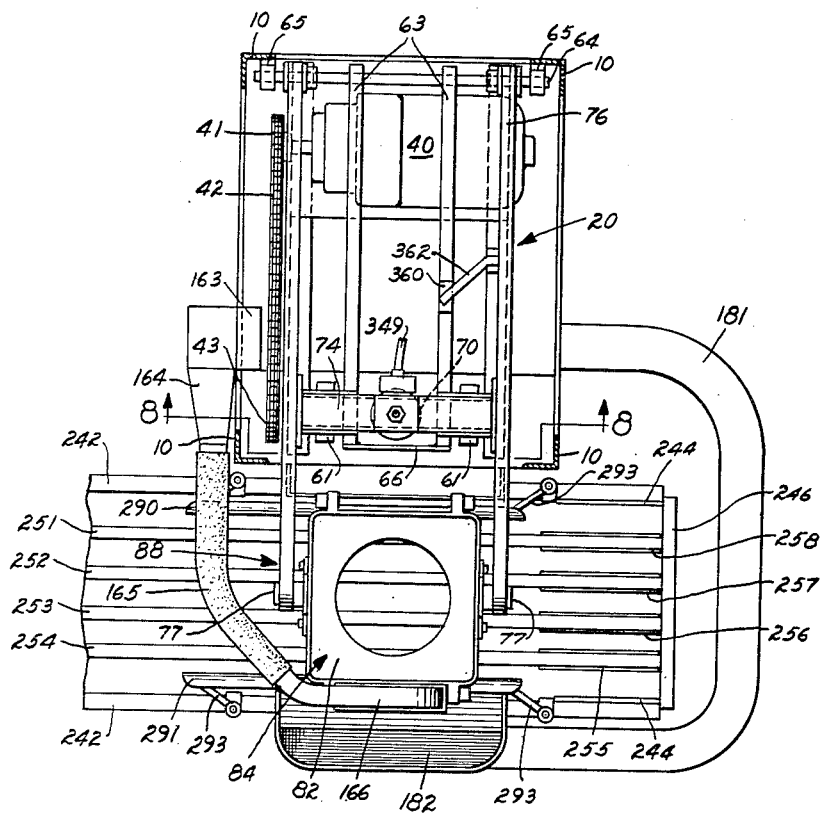
Figure 7 is a fragmentary horizontal sectional view taken along the line and in the direction of arrows 7—7 of Figure 1.

Referring again to Figures 3 and 5, another air inlet into the manifold 162 is provided by way of a funnel nozzle 180 from a position behind the bag being filled. From adjacent the lower portion of the bag B and as shown in Figure 7, a duct 181 extends around to the front of the bag position on the machine where it is connected to the nozzle 182 for picking up air along in front of the bag position.

It will be appreciated that the bag-filling operation, particularly when cotton bags are being filled, or where easily dispensible materials such as flour, alfalfa meal or carbon black is being filled into bags, that some dust is likely to leak out despite the most earnest efforts to maintain a tight spout-bag connection, or where cloth bags are used, some dust passes right through the cloth or out of the open top of a paper or cloth bag before it is closed. All such dust is picked up and enters through the nozzles described and through the duct works from the region around the base of the bag and round the spout and is drawn into the manifold 162, as shown by arrows 187 and 183. From the manifold 162 the dust-laden air passes to and then through filters 185—185. At the bottom of the housing 160 there is provided a removable pan 186 in which solids of large particle size are collected. The entire rear panel of the housing 160 can be removed for servicing the pan 186, filters 185 or motor 190.

After passing through the filters 185 the air is drawn into the chamber 188, Figure 5, which contains the motor 190, upon which the blower wheel 191 is mounted. The blower wheel is of the sirocco type and is contained within the scroll housing 193, see Figure 3. The cleaned air is exhausted through a screen 194 to a position somewhat below the motor 40 of the shaker-drive mechanism.

In Figures 18 through 20 are illustrated a form of bag spouts and clamp auxiliary mechanisms which is utilized for filling the smaller sized bags, such as 50 pound bags. When such bags are to be filled, the spout has attached to it an inner sleeve member generally designated 201, which is held in place by a set screw at 202. Sleeve 201 is tapered at its upper inner edge and extends downwardly through a second tapered portion 203 to a tube section of reduced diameter at 204, which is shaped to receive a particular size of smaller bag being filled. The spout 201 is provided at 205 with circumferential heading or inset rubber bands for better grip on the bag. The bag clamps are of a size to fit the outer surface extension 204. These clamps are generally designated 206 and 207. The clamps 206 and 207 may be of any of the types herein described but are set at a lower level by means of the extension members 208—209. These members 208 and 209 are provided with holes to receive, respectively, the pivot screws 210—211 and 212—213 and, accordingly, as the bell cranks and stabilizer lever mechanisms previously described move in bag clamping and bag releasing movement, the members 208 and 209 are likewise moved back and forth as shown by arrows 215 and 216. The lower end of the members 208 and 209 are provided with screws 217—217 and 218—218 to receive the clamps 206 and 207, respectively. In this manner the clamps are brought to engagement with the spout 204 which is of reduced diameter and yet the entire extensions 208 and 209 and the smaller sized clamps 206 and 207 as well as the spout 201 can be removed or installed in a very short time to permit the filling of any size bags.

In Figures 21 and 22 there is illustrated a form of spout and bag clamps for filling certain bags. Thus the spout 220 is of generally elliptical shape and is formed of two portions 220A and 220B that are attached together by a suitable internal fastening at 221, the latter being held by screws as illustrated.

The bag clamps 222 and 223 are shaped so as to conform to the shape of spout portions 220A and 220B, respectively. When the spout is of elliptical configuration, as illustrated, the bag clamp portions 222 and 223 can be brought somewhat closer to the center plane of division which is longitudinally of the spout through the major axis M—M, see Figure 22. Only a small portion of the bag mouth BE—BE' is left unclamped between the adjacent portions of the two clamps 222 and 223 when they are in bag holding position.

The mounting of the clamps 222 and 223 on the operating mechanism is precisely the same as previously described with reference to the form of bag clamp shown in Figures 3, 6, 10, 11 and 12-15, previously described. Indeed, the elliptical bag spout 220 and its cooperating clamps 222—223 can be substituted for the circular bag spout 93, previously described, without otherwise altering the bag-filling machine.

Figure 4:
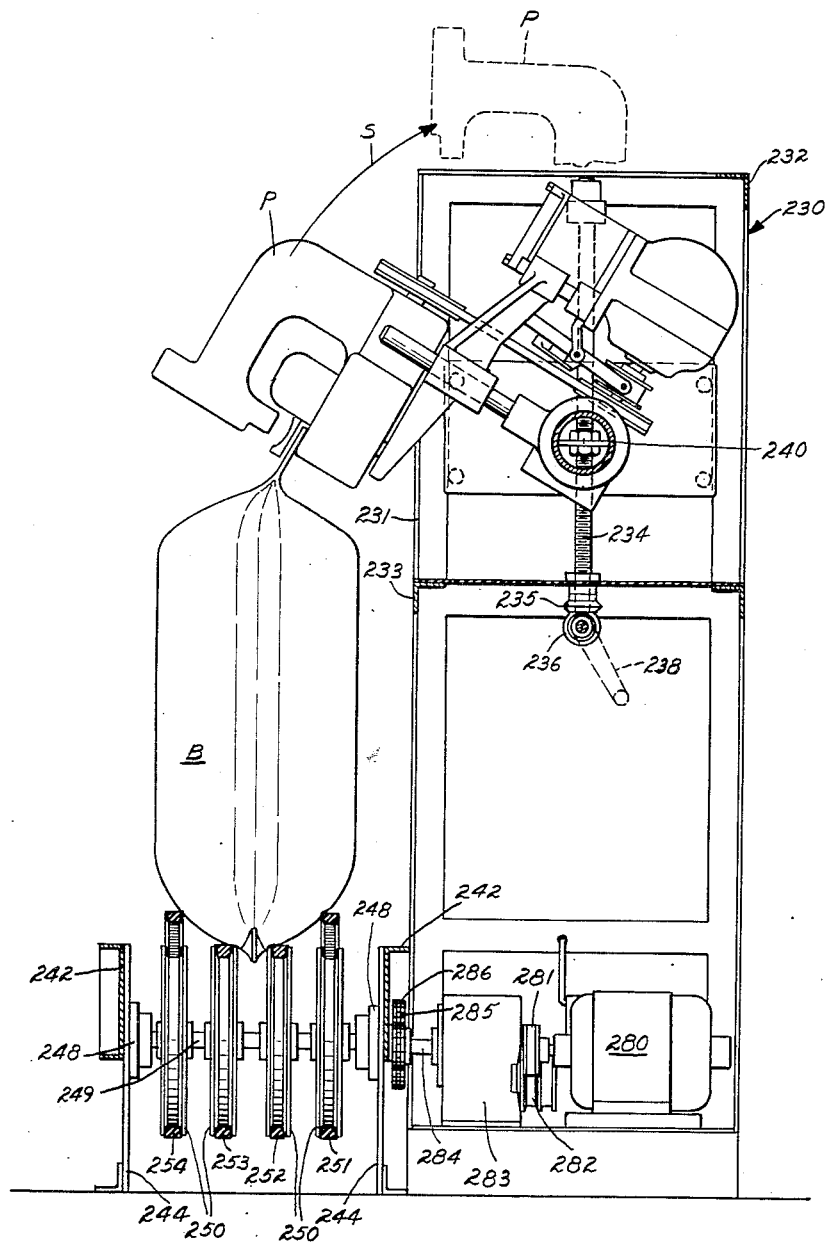
Figure 4 is a vertical sectional view taken along the line and in the direction of arrow 4—4 of Figure 2 and illustrates a "paper head" sewing station.

Referring to Figures 1, 2 and 4, particularly at station II, there is located a bag sewing machine which serves to stitch closed the open tops of the bags B after they have been filled. The bag sewing machine includes a sewing machine stand generally designated 230 having upright frame members 231 and cross frame members 232 and 233. Upon each side of the cross frame members there are journaled a pair of adjustment screws 234—234 which have their lower ends mounted in journals on cross frame member 233 and their upper ends in journals in cross frame member 232.

The lower ends of the screw shafts 234 are provided with bevel gears 235 which are arranged to mesh with corresponding bevel gears 236 on the shaft 237 that is journaled in the side frame members 231. The shaft is provided with a hand crank 238. Accordingly, when the hand crank 238 is turned, this will rotate the screws 234 simultaneously and in the same amount. The screws 234 are threaded through a tubular cross member 240, which serves as the mounting for the sewing machines P and C. The screw-thread connection between the screws 234 and the member 240 is illustrated best in Figure 4, wherein there is illustrated a central web in the tube 240, which has welded to it at the top and bottom surfaces a pair of ordinary machine nuts. These serve (at each end of shaft 240) as threaded apertures through which the screws 234—234 pass. Accordingly, as the hand crank 238 is rotated, the tubular cross frame member 240 will be raised and lowered evenly by any amount within the range of screws 234 and the sewing machines P and C will also be raised or lowered since they are carried on the tube 240.

The sewing machine C is especially adapted for the sewing of cotton bags, whereas the sewing machine P is especially adapted for the sewing of paper bags. In cooperation with sewing machine P there is provided a feed roll 241 that is mounted on the left frame member 231. From the feed roll a paper web PW is fed downwardly into the paper sewing machine P, the web being folded over the end of the bag by the machine and stitched onto the paper bag during the final sewing operation as is well known.

The sewing machines are mounted for swinging movement from an operating position such as shown for machine P to a vertical position and the sewing machine head is swung vertically about the shaft 240. When in this (vertical, upwardly swung) position, the sewing machine is vertical above the sewing machine stand 230 and is entirely out of the way. The out-of-the-way position is shown for the paper sewing machine P in dotted lines in Figure 4 of upward swinging movement to raise such sewing machine from the operating to the out-of-the-way position as shown by the arrow S.

Stops not illustrated are provided on the pivot shaft 240 for limiting the swinging movement of each of the sewing machines P and C to the operating position, such as shown for machine P in Figure 4, and the out-of-the-way position as shown in dotted lines in Figure 4. The machines stay in either position due to the weight distribution of the machine or may be provided with mechanical latches, not illustrated, or other detents for holding them in the two positions.

Referring to Figures 1 and 2, the conveyor mechanism III extends from the bag-filling station I to the left past the bag sewing station II to a discharge end at the left, as shown in Figures 1 and 2. The conveyor mechanism includes a pair of side frame members 242 which are mounted in spaced-apart relationship by a plurality of cross frame members 243. The side frame members are channel shaped as shown in Figure 4, and are supported at any desired height above the level of the floor by means of floor brackets 244. The conveyor frame mechanism is provided at its left end as shown in Figures 1 and 2 with a through shaft 249, which is mounted upon journals 248 on side frame members. Upon the shaft 249, at evenly spaced intervals therealong, are mounted a plurality of V-belt pulleys 250. The shaft 249 extends rearwardly of the entire machine, as shown in Figure 2, and is provided at its rear end with a drive sprocket 288 which is connected by chain 286 to a driving sprocket 285 on shaft 284 of the speed reducer 283 which is in turn driven through the belt and pulley arrangement 281—282 from the conveyor drive motor 280, see Figure 4.

At the opposite end of the conveyor frame and between the floor brackets 244 there extends a shaft 264 upon which at uniform intervals there are mounted a plurality of upwardly extending radius arms, each of which serves as a mounting for one of the idler pulleys for one of the belts constituting the conveyor. These mountings are similar and therefore only one need be described in detail. Thus, on shaft 264 there is mounted an upwardly extending radius arm 259 which at its upper end is provided with a stub axle 266, upon which a pulley 255 rotates.

The arm 259 is pulled to the right, as shown in Figures 1 and 2, by means of a link 267, which is pivoted at 268 to the arm 259. The link 267 passes through a bar 246 on the end of the conveyor frame and is provided at its outer end with a nut, which when screwed down pulls on the link 267 and causes the arm 259 to be drawn to the right, as shown in Figures 1 and 2, thereby moving with it the pulley 255, so as to tension the belt 254 which runs over the pulley 255 and a corresponding pulley on the opposite end of the machine.

The remaining belts 251, 252 and 253 run over the pulleys 258, 257, 256, respectively, at the right-hand end of the machine, these pulleys in turn being mounted upon the upwardly extending radius arms 262, 261 and 260, which are similar in every respect to the arm 259 that has been described, except that arms 260 and 261 are shorter and hence support their pulleys 256 and 257 at lower levels than pulleys 255 and 258. In this manner, each of the belts 251—254 may be brought to proper tension so as to run neatly and adequately on its pulleys without slipping. Suitable idler pulleys are provided at 245 and 247 on the bottom of the conveyor frame for each of the belts so as to determine its path of back travel and prevent excessive drooping.

Referring to Figure 16 it will be observed that each of the belts is provided with a trough-like support along its upper course of travel. Thus, the belt 251 is provided with a supporting trough 251A. Likewise, belt 252 has a supporting trough 252A; 253 has a supporting trough 253A; and belt 254 has a supporting trough 254A.

The pulleys 255 and 258 are set at a somewhat more elevated position than are pulleys 256 and 257. Consequently, the belts 251 and 254 are more elevated than the belts 252 and 253. The troughs 251A and 254A are mounted on a conveyor frame by suitable brackets so that they support the undersides of the belts 251 and 254, respectively, at the levels of the pulleys 258 and 255, respectively, until the belt is to near the delivery end of the conveyor 250. Similarly, the troughs 252A and 253A are mounted on suitable brackets as shown in Figure 16, so as to support the belts 252 and 253, respectively, at the level at which they run off the pulleys 257 and 256, respectively, this level being likewise maintained throughout the operative run of the conveyor belt from one end of the conveyor to the other.

It may be noted that the center pulleys 250 at the drive end of the conveyor can be set so that the belts 252 and 253 run directly off their supporting troughs 252A and 253A and onto such pulleys 250; whereas the belts 251 and 254, after leaving their supporting troughs 251A and 254A, as shown in Figure 1, slant downwardly onto their drive pulleys 250. The troughs 251A and 254A may be given a downward curve or slant adjacent their delivery end pulleys 250, if desired, so as to guide and support the belts during this part of their travel also.

The elevations of the belts 251 and 254 over the belts 252 and 253 have the effect of forming what is, in effect, a trough, which conforms more or less to the bottom of a filled bag and supports it without tipping either forwardly or backwardly in respect to the conveyor throughout the operative travel of the conveyor. The spaces between the belts is a distinct advantage as it permits mechanisms to operate through the spaced belts for engaging the bags and permits any spillage to fall directly through the conveyor and onto the floor for easy clean-up.

Accordingly, when the drive motor 280 (Figure 4) rotates, it pulls the upper course of travel of the belts 251—254 to the left, as shown in Figures 1 and 2, and carries any bag B which may be on the conveyor to the left from the bag filling station I to the sewing station II. The rate of movement of the conveyor is regulated by regulating the motor or the speed reducer 283 so that the speed of movement of the bags past the sewing machines P or C, whichever one may be in use, is at the same rate of travel as required for the sitching mechanism of the sewing machine. Accordingly, the bag moves just as rapidly as is needed for proper stitching of the top of the bag without the necessity of crowding or holding the bag by the operator.

Referring particularly to Figures 1, 2, 3, 16 and 23 at the bag filling station I, there is provided a bag saddle generally designated 300 for supporting the bottom of the bag during the filling operation and side supporting members 290 and 291 for steadying the sides of the bag adjacent to the base thereof, likewise during the filling and during the first part travel of the conveyor mechanism when the bag is carried. The side supporting bars 290 and 291 are similarly mounted on bracket arms, such as the arms 293—293 for the side support 290. The arms 293 are pivotally connected to brackets 292 on the inside of the supporting plate 290 and then extend over and are pivotally attached to the upper end 295 of supporting bolts 294 that are mounted on the conveyor framework. By loosening the nuts at the mounting 295 the arms 293 may be rotated slightly so as to bring the face of the supporting plate 290 closer or further apart from the center line of the conveyor, and to hold the plate 290 parallel to the course of travel of the bag on the conveyor.

The mounting of the supporting plate 291 is exactly similar. Both of the plates 290 and 291 are curved at their bottom and top edges so as not to present any rough surfaces against which a bag might be torn. The ends of such side supporting plates may likewise be smoothly curved if desired.

By suitable adjustment of the supports of the plates 290 and 291 they may be brought closer together or further apart and maintained parallel so as to accommodate any size bag that it is desired to fill on the machine.

The saddle mechanism 300 supports the bottom of the bag during the filling operation, during which the bag is pulled up and down (bounced) on the saddle mechanism 300 while the material is fed down into the bag, thereby to compact the material in the bag. The saddle 300 is composed of two bag supporting shoes 301 and 302 which are shaped pieces to conform generally to halves of the bottom of a filled bag on opposite sides of the bottom seam. When they are in the bag supporting position, as shown in Figure 3, the saddles are spaced apart from each other at 303, which allows enough space for the bottom seam of the bag to protrude. The shaped bag saddle shoes 301 and 302 are carried on similar operating arms 305 and 306, respectively, which are pivoted on the shafts 307 and 308 for swinging movement from an out-of-the-way position, as shown in full lines in Figure 16 to the bag supporting position, which is shown in Figure 3 and in dotted lines in Figure 16. The arm 305 has attached to it a segmental gear 309 which mates with a similar gear 310 that is attached to the arm 306. The arm 306 has likewise attached to it a side arm 311, which terminates in the pivot connection 312 to which a piston rod 313 of the cylinder 315 is adapted to be connected.

The cylinder is pivotally connected at 316 to the bracket 317 on the frame of the bag-filling machine. The cylinder 315 has an upper air inlet 318 and a lower air inlet 319. When air is introduced into the upper air inlet 318 its serves to drive downwardly its piston, not illustrated, and thereby pushes the piston rod to the full-line position shown in Figure 16 which accordingly moves the bag saddle supporting shoe 302 to its full-line position. Arm 311 also incidentally operates electrical control switch 476 in this position. The movement of the arm 306 (and shoe 302) is communicated through the partial segmental gears 310 and 309 to the supporting arm 305 of the saddle shoe 301, which is likewise accordingly moved to the non-bag-supporting position shown in full lines in Figure 16. When air is introduced through the bottom connection 319 into cylinder 315 the piston, which is of the double action variety, is moved upwardly in the cylinder 315, thus retracting the piston rod 313. This causes the arms 305 and 306 and the bag-supporting shoes 301 and 302, mounted respectively thereon, to be moved from the full-line position of Figure 16 to the dotted line position, which is also shown in Figure 3, and switch 476 to be operated to another position. In this position a bag B will be supported upon the shoes 301 and 302 between the side supporting plates 290 and 291.

Controls and operation

The bag packing mechanism herein described can be operated by either one or two persons. If operated by one person a bag is filled and the operator then steps from the bag filling station I to the sewing station II and completes the sewing operation and then steps back to the bag filling station I so as to repeat the cycle. Two operator controls are provided and are most conveniently foot-operated. One control 325, in the form of a toe lever, is mounted on the conveyor frame at the position of the right foot of an operator when standing at the bag filling station I. This toe lever has a dependent blade which is easily pushed by movement of the operator's toe in the direction of arrow 326, see Figure 1. This causes the rotation of the shaft 327, see Figure 17, upon which the toe lever 325 is mounted in journals 328—328 in a conveyor frame. When so moved, an extension 329 on the rear end of shaft 327 pushes upwardly against the operating member 330 of an operating switch 331, which is in one of the electrical controls hereinafter referred to in greater detail.

At the sewing station II there is provided another toe lever 332 which likewise is mounted upon a shaft 333 in a conveyor cross-frame so that it may likewise be moved in the direction of arrow 334 for closing an electric circuit for sewing machine operation, as will presently be described.

Referring to Figure 23, there is in this figure illustrated schematically the air circuits and mechanisms operated thereby that are used in conjunction with the apparatus, together with some of the electrical components of the system. Thus, it will be observed that the bag-filling spout and the clamp mechanism which, as previously described includes air-operating cylinders 116 and 116A on opposite sides thereof, for the operation of the bag clamps 122—123. For bag clamping there is provided air line 340 through which air is injected via the cross connection 341 to the cylinders 116 and 116A, and when air is thus injected into the cylinders 116—116A, their positions 117 and 117A will be forced outwardly to cause the clamps to be moved to bag-clamping position. For retracting the bag clamps, that is to say moving them to non-clamping position, air line 342 is provided, which serves a branch connection 343 leading to the opposite ends of cylinders 116 and 116A. The line 340 (clamping) extends to junction 344 and thence along a continuation line 340 to the four-way solenoid operated controls valve, generally designated 346. From the junction of lines 344 a branch extends through line 347 to a quick exhaust valve 348 and thence though line 349 to the upper port of cylinder 70, which accordingly forcibly holds the piston down in cylinder 70. Likewise, line 342 from the other ends of cylinders 116 and 116A, extends through junction 350 and then by a continuation of line 342 to the upper port 352 of the valve 346. From the junction 350 in this line, a branch line 353 extends through the quick exhaust valve 354 and thence via line 355 to the bottom port of cylinder 70. It may be explained that when pressure is delivered to the line 347 it closes the quick exhaust valve 348 and the pressure is delivered via line 349 to the upper port of cylinder 70. Similarly, pressure delivered via line 353 to the quick exhaust valve 354 is delivered via line 355 to the lower port of cylinder 70. However, when the pressure is reduced sharply in either of the lines 347 or 353, the quick exhaust valve 348 or 354, respectively, open their exhaust ports 348A and 354A so as very quickly to bleed the pressure from the portion of cylinder 70 served by such line.

The solenoid controlled valve 346 is operated by a solenoid 345 served by lead wires 356 and 357. When the solenoid coil 345 is energized, air is delivered from the pressure supply line 358, thence through the body of valve 346 to supply air to line 340, which accordingly causes cylinder 116 and 116A to drive their pistons 117 and 117A, respectively, outwardly so as to move clamps 122 and 123 to the bag-clamping position. Air is simultaneously supplied via valve 348 and line 349 to the portion of cylinder 70 above the piston area, which therefore firmly pushes the piston down and consequently moves the spout and bag clamp supporting arms 76—76 to their lower position preparatory to the bag-shaking operation.

When the solenoid 345 is de-energized, air is exhausted from line 340 through the exhaust line 359 on solenoid valve 346, and quickly exhausted via the quick exhaust valve 348, as previously described. At the same time air under pressure is delivered from line 358 through valve 346 to line 342 and through it to the opposite ends of cylinders 116 and 116A, causing the pistons and piston rods therein to be completely retracted, thereby causing the clamps 122 and 123 to be moved to the bag unclamping position. Simultaneously, air is delivered via line 353 and valve 354, which is then closed, to line 355 and this causes the piston in cylinder 70 to be elevated, thus causing the arms 76 to be raised with resultant elevation of the filling spout 84 and the associated bag clamp mechanism to a position above the top of the filled bag. This permits the filled bag to move on the coneveyor transversely in respect to the filling spout without any interference.

On the inner arm 63 (Figure 3) there is mounted a switch 360 which has an operating stem 361 positioned so as to be engaged by a side arm 362 mounted on one of the bag holder arms 76. When the bag holder arms are brought to the position shown in Figure 3, this switch is closed, but when the bag holder arms are brought to the position shown in Figures 6 and 23, the switch 360 is in the open circuit condition. Switch 360 has terminals 363 and 364.

The bag saddle mechanism 301—319 and its operating cylinder 315 are operated from a bag saddle solenoid valve generally designated 365 (Fig. 23) which is arranged to be energized via terminals 366 and 367. The bag saddle solenoid valve 365 which is likewise a four-way valve, supplies air from line 358 to either of the lines 318 or 319 and simultaneously exhausts the line to which air is not supplied. Thus, when the bag saddle solenoid valve is de-energized it supplies air to line 319, which serves to move the piston and piston rod 313 into the retracted condition and accordingly moves the bag saddles 301 and 302 to the bag supporting position. When the bag saddle solenoid valve 365 is energized, air is exhausted from line 319 to line 359 and air under pressure is delivered from line 358 to line 318, thus causing the bag saddle pads 301 and 302 to be moved to the non-supporting position shown in Figure 23. In this position arm 311 engages the operating rod of switch 476 and moves this switch to open circuit condition.

The electrical controls, including the solenoid operated valves 346 and 365, together with relays, some of the switch contacts, manual switches, etc. are housed within a cabinet 368 on the right side of the bag-filling and packing mechanism, as shown in Figure 1.

Referring to the wiring diagram, Figures 24 and 24A, power is supplied to the system via lines $L_1$ and $L_2$ from any suitable alternating supply source, preferably of 110 volts potential. Line $L_2$ is grounded and line $L_1$ is regarded as the hot line. A circuit extends from junction 372 on line $L_1$ through a manually operated on-and-off switch entitled the "Packer" switch 373 and thence over line 374 to junction 375, from which a circuit extends over line 376 to junction 377 and through it to junctions 378, 379 and 380. These junctions are all terminals of a relay generally designated 403 which has an operating coil 402, two pair of normally open contacts 412 and 413 and one pair of normally closed contacts 414 and 415. From junction 378 on relay 403, a circuit extends through the normally closed pair of contacts 414 (which are closed when coil 402 is de-energized) and line 382 to junction 383 and thence through line 384 through the coil 385 of a time-delay relay 396, and from coil 385 to junction 390 on the ground line L₂. The operation of relay 396 serves to time the shut-off of the motor starter control for the conveyor motor 280. Relay 396 has a normally closed contact 386 and a normally open contact 387. Assuming the hand switch 373 to be closed, as is the case when it is desired to place the bag-filling and packing machine in operation, the circuit above described is completed, thus starting the operation of time delay relay 396. A circuit is also completed at this time from junction 383 through the normally closed contact 386 of relay 396, thence via line 381 through a pair of normally closed contacts 388 on the conveyor relay generally designated 389, and thence via line 397 through junction 391 to line 392 and coil 393 of the motor starter relay generally designated 395 to junction 394 on the ground line L₂.

The motor-starter relay 395 which controls the conveyor motor 280 accordingly operates and the conveyor motor 280 begins to revolve and drives the conveyor III. The operation of the conveyor is continued until the conveyor travel adjustable time delay relay 396, above referred to, completes its timing operation, whereupon (although its coil 385 still remains energized through its circuit previously described) normally closed contacts 386 then open and normally open contacts 387 close. This initial operation of the conveyor accomplishes no purpose but merely occurs and conditions the apparatus for subsequent sequential operation.

The closure of contact 387 on the conveyor travel adjustable time delay relay 396 establishes a circuit which is the same as previously described to terminal 383 and thence from terminal 383 through contacts 387, line 398, through the foot switch 325, previously referred to (which is closed by foot operation by the operator at the Filling Station I), and thence from junction 399 through line 400, junction 401, through coil 402 of relay 403 and thence over line 404 to junction 405 and through line 406, junction 407, through contacts 408 of the shaker adjustable time delay relay 409 and through junction 410 and thence to junction 411 on ground line L₂. This causes the energization of relay 403 and causes its contacts 412 and 413 to be closed, its contacts 414 and 415 to be opened.

The closure of contacts 412 establishes a holding circuit for the coil 402 of relay 403 from junction 377 through contacts 412 to junction 399 and thence through line 400 to junction 401 and through coil 402 of the circuit previously described. This, accordingly, maintains relay 403 in the operating condition.

When relay 403 was in the de-energized condition, its contacts 415 were closed and consequently a circuit had been maintained from junction 372 on line L₁, thence through the switch 373, line 374, junction 375, line 376, terminal 380, relay contacts 415, and line 417, through the coil 418 of the bag saddle solenoid valve 365, thence through junction 419 and through line 420 to junction 410 and thence to junction 411 on the ground line L₂. Accordingly, the bag saddle solenoid valve had been energized. Under these conditions the bag saddle solenoid valve 365 was therefore energized as soon as switch 373 was closed and up to the time relay 403 operated, and with valve 365 energized, and air was admitted through that valve through air line 318 to cylinder 315 of the bag saddle operating mechanism, which caused the bag saddle members 301 and 302 to be moved to the non-supporting position shown in Figure 23. Upon energization of relay 403, with consequent opening of its contacts 415, this circuit through the bag saddle solenoid valve 365 was then interrupted and the air supply to line 318 was cut off and that line exhausted to atmosphere and air simultaneously admitted to air line 319 causing the piston in cylinder 315 to be retracted (pulled in) with consequent movement of bag saddle pads 301 and 302 to the bag supporting position.

The opening of contacts 414 of relay 403 in the initial energization circuit of that relay, has no effect at this time, since a holding circuit was established to relay coil 402 through contacts 412.

From junction 372 on line L₁ and through the closed switch 373 a circuit also extends via line 374, junction 375, line 376 and junction 379 through the then closed contact 413 of the relay 403 and thence over lines 421 to the contacts 422 of the relay 426. At that time relay 426 may or may not have been operated, depending upon the condition of the beam scale switch 450 which is to be described.

Above the flour spout 80 in the apparatus there is a flour hopper or scale bucket 448, which is mounted by means of suitable pivotal bearings or knife points 449 upon a beam scale 450 that is supported upon the bearing 455, the beam scale being counterweighted by the weight 453. Through a mechanical interlock 452 the beam scale closes the switch 451 when an appropriate amount of material is in the hopper 448, but does not close it until such appropriate amount is in the hopper. The hopper 448 is provided with a gate or dump valve 458 which is pivoted at 457 and normally closed by the weight 454 on the arm 456 that is attached to the gate valve. However, when there is a load of material against the gate valve 458, it will press the valve to the open position shown in dotted lines in Figure 24, provided the latch 460 is moved in the direction of arrow 459 to the unlatching condition. The latch 460 is pivoted at 462 upon the hopper and has a crank arm 447 that is positioned so that it can be struck by the end 461 of the lever 463 which is pivoted at 464 and arranged to be moved in the direction of arrow 446 by the energization of coil 430 of the solenoid 431 which, when energized, causes the solenoid core 432 to be drawn downwardly. A relay coil 433 is connected in parallel with the coil 430 of the solenoid 431 and when the coil 433 is energized it causes the closure of contacts 444 upon the stationary contacts 445.

Referring to the circuit previously mentioned through contacts 422 of relay 426, this circuit will be established through coils 433 and 430 in parallel end to ground line L₂, provided the hopper switch 451 is closed. Assuming such switch to be closed, the circuit extends from contacts 422 of relay 426 through the coil 430 of solenoid 431 and relay coil 433 in parallel and then through the closed contact 451 to ground line L₂. The solenoid 430 accordingly being energized causes the solenoid coil 433 to move downwardly, pushing down upon the left end of the lever 463 which, upon striking the end 447 of latch 460, causes it to move in the direction of arrow 459, thereby unlatching the dump gate 458 of the hopper 448. As a result, the material within the hopper 448 is dumped down the spout and into the material hopper 80 of the mechanism previously described, see Figure 3.

Meanwhile, the coil 433 is energized and contacts 445 are closed, thereby establishing a circuit from junction 372 on line L₁ through switch 373, line 374, junction 375, line 376, junction 377, closed contacts 412 to junction 399, line 400, to junction 401, line 465 to junction 466, then through the coil 467 of relay 426, then through line 468, through the then closed contacts 423 of relay 426 (since relay 426 is then de-energized), through line 469, contacts 445, line 470 to ground line L₂. Relay 426 accordingly operates and closes its contacts 424 and 425 and opens contacts 422 and 423. It is noted that contacts 424 close before contacts 423 open and a circuit is accordingly maintained through the relay coil 426 from lines 468 through the then closed contacts 424 to junction 405, through line 406, junction 407, through the then closed contacts 408 of the shaker adjustable time delay relays 409 through junction 410 to junction 411 on ground line L₂. In this way 426 is maintained operated even though its contacts 423 through which it became energized initially were opened upon operation of the relay.

The material in the hopper 448 has accordingly been dumped and begins to fall into the bag. It may be noted that before the operator presses the packer foot switch 325 he has already placed a bag on the spout and then when he pressed the foot switch 325 as previously described, this caused the bag saddle solenoid valve to be actuated to the bag saddle supporting position and when the bag saddle mechanism moved to the bag supporting position it in so doing caused the piston 313 to move away from the roller 475 of the switch 476, see Figure 16. When the piston 313 thus moved in the upper direction it disengages from contact with roller 475 and a spring within the switch mechanism 476 causes the switch arm 477 to move in the direction of arrow 478, thereby causing the bag saddle switch 476, which is normally open, to be closed. Accordingly, as soon as the bag saddle has come up to bag supporting position, a circuit is established from junction 375 adjacent to switch 373 through the bag saddle switch 476 and through the coil of bag holder solenoid valve 346 and thence to junction 419 through line 420, junction 410, to junction 411 on the ground line L₂. This circuit causes air to be admitted via line 341 to each of the bag clamping cylinders 116 and 116A so as to cause the bag clamps 122 and 123 to move to bag clamping position, as shown and described with reference to Figure 23. Air was also simultaneously admitted above the piston in cylinder 70, causing the arms 63 and 76 to be firmly interlocked preparatory to the shaking operation. Therefore, by the time relay 426 operates, the bag is already in place and the material falls into the bag.

The closure of contacts 425 on relay 426 establishes a circuit from line L₁ through switch 373, thence through line 374 junction 375, line 376, junction 377, through holding contacts 412 to junction 399, thence through line 400 to junction 401 and line 465 to junction 466, thence through line 480 through junction 481 and line 482 through the coil 483 of the shaker adjustable time delay relay 409, thence through line 484 to junction 485 and through line 486 through the then closed contacts 425 of relay 426 to junction 407 and then through the normally closed contacts 408 of the shaker adjustable time delay relay 409 which, because of the time delay function of relay 409, are still closed even though the coil 483 became energized, and through junction 410 to junction 411 on the ground line L₂. The coil 483 of the shaker adjustable time delay relay 409 is accordingly energized but the contacts 408 are not opened until after a predetermined time after initial energization of coil 483, which time may be adjusted conveniently by the operator. This relay times the time of operation of shaker motor 40.

As previously described, switch 360, which is mounted on inner arm 63 of the shaker mechanism (Figures 3, 6 and 23) is moved to closed position by engagement of arm 362 on the spout and bag clamp supporting arm 76, when the piston 70 moves the arm 76 from the position shown in Figures 6 and 23 to the position shown in Figure 3. Therefore, a circuit is also established from junction 481 on line 480, thence through the coil 487 of the shaker motor control relay (of motor 40) and through line 488 through terminal 364 on the bag holder switch 360 and then through terminal 363 to junction 485 and through then closed contacts 425 and 408 of relay 426 and relay 409, respectively, and to ground line L₂. Therefore, the shaker motor relay 490 operates and current is supplied through its contacts to the shaker motor 40, Figure 3, operates, thus causing arms 76 to be moved rapidly up and down, which consequently causes the bag to be moved up and down in a shaking operation for compacting the material into the bag as it falls from the hopper.

It may be noted, parenthetically, that the circuits for the motor 40 from its control relay 490, the circuits from the conveyor motor relay 395 to conveyor motor 280, and the circuits from the sewing machine control relays 519 and 526 to the motors of the sewing machines C and P, respectively, have been omitted since the motor connections are conventional and are adapted to the particular type of power source available. It is sufficient for the purposes hereof to understand that when any of the motor control relays mentioned is energized, the motor which it controls will be caused to operate.

After a short interval relay 409 operates and when it does so it de-energizes relays 402 and 426. This causes the shaker motor relay 490 to be de-energized and the shaker motor 40 stops; the de-energization of relay 403 causes the bag saddle solenoid valve 365 to be de-energized with consequent movement of the bag saddle shoes 301 and 302 to the non-supporting position shown in full lines in Figure 16. The filled bag is, therefore, deposited downwardly upon the conveyor belts 251, 252, 253 and 254. The movement of the bag saddle mechanism to the non-supporting position likewise opens switch 476 with consequent de-energization of the solenoid bag holder valve 346 and the bag is consequently released from the bag clamping position as it is deposited on the conveyor. The piston in cylinder 70 is also pushed up, consequently elevating the bag spout etc. De-energization of relay 426 opens the circuit to the hopper latch dumping mechanism, but this has no effect since the circuit was previously broken by opening of the beam switch 451 as the hopper was emptied, but the circuit is prepared for the next operation and more importantly the hopper cannot again be dumped until relays 403 and 426 are again energized in that order. The de-energization of relay 426 also causes the de-energization of the shaker adjustable time delay relay 409, which then re-sets so as to be ready for a subsequent timing operation.

De-energization of relay 403 causes closure of contact 414 and consequently a circuit is re-established through coil 385 of relay 396 which controls the conveyor travel. This relay, the time constant of which may be adjusted, then begins its timing operation, and the conveyor motor starter relay 395 is re-denergized and the conveyor runs until relay 396 again operates and opens its contacts 386. The conveyor travel adjustable time delay relay 396 is adjusted so as to cause the movement of the filled but still open bag a short distance down the length of the conveyor preparatory to the sewing operation, which may be carried out by the same or another operator. The same or other operator then proceeds with the closure stitching operation utilizing one of the sewing machine heads P or C, which, as previously described, has swung down into place.

Each of the sewing machine heads is of the type having a motor which rotates constantly (when turned on) while the machine is in service and is provided with a magnetically operated clutch which engages the motor and the stitching mechanism so as to produce the stitching operation, as is well known. In the paper bag sewing machine P, the sewing machine is provided with a switch 495, illustrated in Figure 24A but not shown in detail in the remaining figures, which is engaged by the unstitched paper of the bag as it approaches the sewing machine mechanism, under the carrying influence of the conveyor. This switch 495 serves to initiate the sewing operation, and the switch is positioned so that it remains closed until the complete bag has been sewed through by the sewing mechanism.

Referring to Figure 24A, in order to put into operation the sewing mechanism, there is provided an on-off push button switch 496 having two contacts 497 and 498 that are manually operated. When the switch contacts 497 are moved to the closed position the contacts 498 are open and vice versa. The sewing machine controls also include a holding relay 500 having a coil 501 and two normally open contacts 502 and 503 that close when coil 501 is energized. When the switch 496 is in the position shown in Figure 24A, a circuit extends from junction 504 on the line L₁, through line 505 and through contacts 498 and line 506 to contacts 503 on relay 500, but since the contacts 503 are open no further operation occurs. When the switch 496 is moved to close contacts 497 (and open contacts 498) a circuit is established from junction 504 on line L₁, through line 505 and contacts 497 and then through line 506' to junction 507 and then through coil 501 of the holding relay 500 where the circuit continues over line 508 and through junction 509 to junction 510 on the ground line L₂. The holding relay accordingly operates and a circuit is established from line L₁ through these closed contacts 502 of relay 500 and through line 511 to junction 512 on line 513, thereby energizing this line as a feeder. Line 513 is connected to contacts 514 and 515 on the conveyor relay 389, previously mentioned. But since the conveyor relay is assumed not to be closed, circuits through either of these contacts is not completed. Feeder 513 is also connected at junction 516 to line 517 which extends through the coil 518 of the motor starter control 519 of the cotton bag sewing machine C and thence through junction 520 and through the manually operated on-off switch 521 to junction 522 on the line L₂. A circuit similarly extends from junction 523 on feeder 513 and then through line 524 and through the coil 525 of the motor starter control 526 of the paper bag sewing machine P, and thence through junction 527 and through a manually operated on-off switch 528 to line L₂. It will be observed that the last two circuits described, to the motor starter for the cotton bag sewing machine and through the motor starter for the paper bag sewing machine, can be energized merely by closing the manually operated switch 521 (for the cotton bag sewing machine C) or the switch 528 (for the paper bag sewing machine P), provided feeder 513 is energized. It will be assumed that one or the other of these sewing machines is desired to be used and the appropriate switch is closed to energize. The sewing operation for such machine therefore is initiated when the clutch mechanism (control 535 or 540) of the selected sewing machine is energized.

For the cotton bag sewing machine energization of the clutch mechanism is accomplished through energization of the conveyor relay 389, this being in turn accomplished by a circuit extending from junction 530 on feeder 513 and through the conveyor foot switch 332, which has been previously described with reference to Figure 1 as operator controlled. This switch 332 is normally open and is closed by the operator placing his foot against it and moving the switch sideways in the direction of arrow 334, as shown in Figure 1. When thus closed the circuit extends from junction 530 on feeder 513 through switch 332 and line 531 and thence through the coil 532 to junction 509 and thence through line 533 to junction 510 on ground line L₂. This circuit accordingly energizes relay 389 which, upon closure, opens the contacts 388 but closes contacts 514 and 515. A circuit is then established through coil 393 of the conveyor motor starter 395, which accordingly initiates operation of the conveyor to move the filled but yet unsewn cotton bag along past the cotton bag sewing machine.

The closure of contacts 514 on relay 389 of the conveyor relay establishes a circuit by line 534 through the coil 535 of a solenoid operated clutch of the cotton bag sewing machine, and thence through line 536 and junction 520 and switch 521 to junction 522. The energization of the cotton bag sewing machine clutch 535 engages the sewing machine mechanism to the already operating motor of the sewing machine and stitching operation ensues, the stitching feed of the sewing machine being approximately the same speed of movement as the rate of travel of the bag on the conveyor mechanism so as not to cause the bag to be pulled or dragged since the conveyor speed is adjusted to the sewing machine speed. It is, of course, assumed that the switch 521 had been closed, thus operating the motor of the cotton bag sewing machine. The operator maintains his foot upon the conveyor switch 332 until the bag has been sewed but need not continue to do so until the bag is delivered off the end of the conveyor, because when sewing is completed, the bag can simply stand on the conveyor and it will be progressed along and delivered off the end of the conveyor as succeeding bags are sewed.

For the stitching of paper bags the switch 528 of the paper bag sewing machine is closed (switch 521 of the cotton bag sewing machine, of course, being opened and that machine being swung up out of the way). This starts the motor of the paper bag sewing machine but stitching does not ensue until the paper bag sewing machine solenoid operated clutch is energized. The operator again places his foot against the conveyor foot switch 332 which establishes a circuit through the conveyor relay 389 previously described, which accordingly operates and causes the operation of the conveyor motor control 389. No circuit is, however, completed in this case through contacts 514 of the conveyor relay 389 to the cotton sewing machine clutch head because the switch 521 is assumed to be open, nor does contact 514 control clutch solenoid 540 of the paper bag sewing machine P. The conveyor accordingly operates and the filled but as yet unsewn paper bag is moved along in front of the paper bag sewing machine. As it moves along the unsewn upper portion of the paper bag engages a switch 495, previously described, on the sewing head, and a circuit is established through such switch from feeder 513 through switch 495 and thence through the clutch solenoid 540 of the paper bag sewing machine and through line 541 to junction 527 and then through switch 528 to ground line L₂. When the clutch solenoid is operated stitching of the paper bag sewing machine is accomplished and is maintained due to the fact the switch 495 is maintained closed until the paper bag has entirely progressed through the sewing machine.

When it is desired to operate the conveyor independently of the above described controls, as where one operator stands ready to stitch the bags as they move along in continuous sequence, this is accomplished by a circuit extending from junction 543 on line L₁, thence through line 544 and through the push button switch 545 which is movable manually to the open or the closed position and vice versa and will stay in either position in which it is placed. The circuit thence continues over line 546 through the coil 393 of the motor starter conveyor relay 395 and to junction 394 on the line L₂. Closure of switch 545 thus makes the conveyor motor operate continuously. Thus, when cotton bags are being sewn with the conveyor running continuously, the full bags are dropped onto the conveyor in succession by sequential operation of the bag filling mechanism I and the second operator picks up the open top of the filled bags as they are carried along in sequence by the conveyor and guides them one at a time through the cotton bag sewing machine C. As each bag reaches the sewing machine the second operator presses against switch 332 which is the conveyor foot switch. This has no effect on the conveyor since the conveyor is operating constantly due to closure of switch 545, but closure of switch 332 serves to energize the cotton sewing machine clutch solenoid 535, due to the operation and relay 389. The operator maintains his foot on the switch 332 only so long as is necessary to sew the bag as it is passing through the sewing machine and then removes his foot from the sewing machine whereupon the cotton bag sewing machine will stop until the next bag is sent through in sequence by the operator.

For continuous operation when filling and closing paper bags, the operator pushes switch 545 which makes the conveyor run continuously, as previously described. Then, as the bags move to the paper sewing machine they engage and themselves close switch 495 which causes the paper bag sewing machine clutch solenoid 540 to be energized as previously described, as long as the stitching of the paper bag is in progress, whereupon the clutch solenoid 540 is de-energized and the paper bag sewing machine stops until the next paper bag comes along.

Thus, fully automatic operation in respect to paper bags can be achieved with one operator.

As many apparently widely different embodiments of this invention may be made without departing from the spirit and scope thereof, it is to be understood that I do not limit myself to the specific embodiments herein.

What I claim is:

1. A machine for filling bags with bulk material comprising a frame, a material hopper mounted fixedly on said frame and having a downwardly discharge opening, a filling spout substantially aligned with said opening and connected thereto by a flexible sleeve, vertically spaced parallel arm means mounted for up and down swinging movement on the frame and connected pivotally to said spout, a pair of bag clamp jaws mounted on the spout for gripping a bag thereon, and power means for oscillating the parallel arm means and spout up and down to bounce a bag connected thereto so as to compact material being filled into said bag.

2. The machine of claim 1 further characterized in that power means is provided for elevating the parallel arm means and hence the spout and clamp jaws to a position above a filled bag.

3. The machine of claim 1 further characterized in that first power means is provided for operating the bag clamp jaws, second power means is provided for elevating the parallel arm means and the spout and clamp jaws carried thereby, and means is provided for operating the first power means to release the bag clamp jaws and the second power means to elevate the parallel arm means and spout and clamp jaws carried thereon.

4. A machine for filling bags with bulk material comprising a spout for delivering said material downwardly, siad spout being provided with bag clamp jaws adjacent the delivering end of the spout, means for oscillating said spout up and down during bag filling, a horizontal conveyor below the spout for conveying filled bags, and supporting saddle means movable in over the conveyor below said spout, said saddle means being shaped so as approximately to fit the contour of a filled bag, means for retracting said saddle means from beneath a filled bag for depositing the bag on a conveyor so as to be carried thereby, and the saddle means comprising arms pivoted at one end and mounted adjacent the conveyor on each side for swinging movement toward and away from the conveyor, said arms being interlocked so that the free ends thereof move simultaneously toward the conveyor and away from the conveyor, a saddle portion mounted on each arm and shaped so that when the arms are swung towards the conveyor the saddle portions form a support above the conveyor and when the arms are swung away from the conveyor the saddle portions are removed from a position over the conveyor.

5. A machine for filling bags with bulk material comprising a spout for delivering said material downwardly, said spout being provided with bag clamp jaws adjacent the delivering end of the spout, means for oscillating said spout up and down during bag filling, a horizontal conveyor below the spout for conveying filled bags, and supporting saddle means movable in over the conveyor below said spout, said saddle means being shaped so as approximately to fit the contour of a filled bag, means for retracting said saddle means from beneath a filled bag for depositing the bag on a conveyor so as to be carried thereby, and power means for substantially simultaneously moving the saddle means to bag supporting position and the clamp jaws to bag clamping position and for then oscillating said spout while material is filled therethrough into the bag.

6. A machine for filling bags with bulk material comprising a spout for delivering said material downwardly, said spout being provided with bag clamp jaws adjacent the delivery end of said spout, means for oscillating said spout up and down during bag filling, a horizontal conveyor below the spout for conveying filled bags to another work station, supporting saddle means above the conveyor and below the spout supporting a bag thereon while the bag is being filled, said saddle means being retractable to a position adjacent the conveyor in which it does not support a bag, power means for operating the saddle means bag clamp jaws, means for driving the conveyor, and sequence means for operating said power means to first move the saddle means to bag supporting position, the bag clamp jaws to bag clamping position and then to operate the means for oscillating said spout to bounce the bag and compact the material being filled therein, and then after the means for oscillating is stopped to move the bag clamp to bag unclamping position and elevate the bag spout and clamp and move the bag saddle means to bag non-supporting position, whereupon the bag is deposited on the conveyor for movement for a controlled period thereon to another work station.

7. A bag filling machine having a scale bucket for weighing a predetermined load, a dump valve on said bucket movable by said load from closed to open position and power latch means for retaining said valve in closed position, a spout for delivering the dumped material downward, said spout being equipped with bag clamps for clamping a bag thereto, vertically oscillatable arm means for supporting spout and bag clamps, power means for oscillating said arm means vertically, power means for elevating said arm means and the spout and bag clamps mounted thereon, a conveyor under said spout for conveying filled bags and a retractable saddle means for supporting the bottom of a bag during filling in spaced relation over said conveyor.

8. The apparatus of claim 7 further characterized in that electrical control means interlocking the several functioning parts is provided, including a manual control switch for initiating operation of the device, said switch being connected for moving the saddle means to bag supporting condition and the bag clamps to clamping position, said scale bucket being provided with switch means which is operated when the scale bucket is full and causes the scale dump valve to operate and the oscillating arm means to operate, and a time delay means for interrupting the oscillating arm means after a predetermined period and for causing the bag clamps to disengage, the saddle means to move to non-supporting condition and the conveyor to operate for a predetermined period.

9. The machine of claim 7 further characterized in that electrical control means interlocking the several functioning parts is provided including a manual control switch for initiating operation of the machine, said switch being connected for moving the saddle means to bag supporting condition and the bag clamps to clamping position, said scale bucket being provided with switch means which is operated when the scale bucket is full and causes the scale dump valve to operate and the oscillating mechanism to operate, and a time delay means for interrupting the oscillating arm means after a predetermined period and for causing the bag clamps to disengage, the saddle means to move to non-supporting condition and the conveyor to operate for a predetermined period, means for operating the conveyor continuously under manual control.

10. In a bag filling machine having a spout for downward delivery of materials being bagged, said spout being equipped with a bag clamp for clamping a bag thereon, the improvement comprising a conduit having nozzles adjacent the bag clamp on the spout and adjacent the base of the bag, means for establishing a negative pressure in said conduit to draw thereinto dust-laden air from the region of each nozzle and means for separating solids from the air so drawn into said conduit.

11. A bag filling machine comprising a spout for downward delivery of materials being bagged, said spout being equipped with a bag clamp for clamping a bag thereon, a conveyor under said spout having a retractable saddle thereover for temporarily supporting the base of a bag during filling, means for vertically oscillating the spout to assist in filling the bag, and vacuum means comprising a blower and air filter connected to a manifold in which a negative pressure is established when the blower is operated and conduits extending from said manifold to air entrance nozzles adjacent the front and rear parts of the bag and from the manifold to an air entrance hood nozzle around said spout and bag clamp.

12. A bag filling machine comprising a scale hopper for weighing a predetermined quantity of material to be bagged, a spout for receiving the material from said scale hopper and for delivering it downwardly, bag clamps on said spout for clamping a bag thereon, a conveyor under said spout, a retractable bag support for temporarily supporting the bottom of the bag during filling and packing, means under the control of the operator for initiating movement of said bag support to a bag supporting position and automatic means operated substantially concurrently therewith for moving the bag clamps to bag clamping position, means operated by said scale hopper when said hopper has a predetermined weight of material therein for dumping said hopper into said filling spout for delivery therethrough into a bag clamped onto the spout and for simultaneously vertically agitating said spout and the bag attached thereto upon said temporary bag support for compacting the material in said bag, timed automatic means for interrupting said agitating means and for unclamping the bag from the spout and moving said temporary support from bag supporting position, thereby to allow said bag to be deposited downwardly upon said conveyor, and means for moving said conveyor.

13. A machine for filling bags with bulk material comprising a supporting frame, spout means for discharging material downwardly, a pair of vertically spaced parallel arms extending from said frame and attached to said spout means on opposed sides thereof, clamps on said spout means for firmly holding the top of an open bag thereon and means attached to the lower one of said parallel arms for supporting and oscillating the spout up and down to compact the bulk material in the bag, said clamp means including a pair of clamp members mounted for movement substantially transversely of said spout, said members being movable toward and away from each other with the spout therebetween, said members being shaped to engage opposite surfaces of the spout for gripping a bag thereon.

14. A machine for filling bags with bulk material comprising a downwardly terminating spout for discharging bulk material to be bagged, a pair of clamps, each shaped to engage opposite partial circumferential segments of said spout, said segments being symmetrical about a longitudinal plane of division through said spout, said clamps when in clamping position engaging all of the periphery of the spout except spaced minor segments at said plane of division, auxiliary clamping wings attached to the ends of each clamp, each said wing being shaped to conform to a surface extending along the surface of the spout from the end of the clamp to the plane of division and thence outwardly along said plane of division, said clamps with said auxiliary clamping wings on each end thereof being mounted for movement toward and away from the spout for clamping action thereagainst, and each of said auxiliary clamping wings being mounted for limited pivotal movement toward and away from the spout in the plane of the clamp on which it is mounted and means for resiliently urging said wings toward said spout.

15. In a machine for filling bags with bulk material comprising a supporting frame, spout means for discharging material downwardly, supporting means securing said spout means on said frame, clamps on said spout means for firmly holding the top of an open bag thereon and means for oscillating the spout up and down to compact the bulk material in the bag, the improvement comprising said oscillating means including a first eccentric means, a second eccentric means positioned in cooperation with said first eccentric means and adjustable means securing said first and said second eccentric means in fixed relation whereby the oscillation of said spout means may be varied.

16. A machine for filling bags with bulk material comprising a supporting frame, spout means for discharging material downwardly, shaker arm means connected at one end to said spout means and supporting said spout means from said frame, said shaker arm means being pivoted at the other end to said frame, first power means for reciprocating said shaker arm means about said pivot for the shaking of said spout means, means for connecting said shaker arm means to said first power means including a pair of members, one of which is movable with reference to the other whereby said connecting means may be elongated and contracted, and second power means for actuating said movable member for said elongation and contraction.

17. A machine for filling bags with bulk material comprising a supporting frame, spout means for discharging material downwardly, shaker arm means pivotally connected to said spout means and pivotally supporting said spout means on said frame, stabilizing arm means pivotally connected to said spout means and pivotally connected to said frame and positioned in vertical spaced relation to said shaker arm means, clamps on said spout means for firmly holding the top of an open bag thereon, and means connected to said shaker arm means for oscillating the spout means up and down to compact the bulk material in the bag.

18. A machine for filling bags with bulk material comprising a supporting frame, spout means for discharging material downwardly, a pair of shaker arms, each of said shaker arms pivoted at one end to said frame and at the other end to said spout means, said shaker arms being disposed one on either side of said spout means, a pair of stabilizer arms substantially similar to said pair of shaker arms, each of said stabilizer arms pivoted at one end to said frame and at the other end to said spout means, said stabilizer arms being disposed one on either side of said spout means, one of each of said shaker arms forming a parallelogram connection between said spout means and said frame in cooperation with its respective stabilizer arm, clamps on said spout means for firmly holding the top of an open bag thereon, and means for oscillating said shaker arms for oscillating the spout means up and down to compact the bulk material in the bag.

References Cited in the file of this patent

UNITED STATES PATENTS

| Number | Name | Date |
|---|---|---|
| 668,079 | Baker | Feb. 12, 1901 |
| 767,590 | Nickerson | Aug. 16, 1904 |
| 858,612 | Mason | July 2, 1907 |
| 1,336,612 | Callahan | Apr. 13, 1920 |
| 1,348,592 | Sparks | Aug. 3, 1920 |
| 1,815,099 | Foote | July 21, 1931 |
| 1,868,538 | McKee et al. | July 26, 1932 |
| 1,981,485 | Westin | Nov. 20, 1934 |
| 2,004,593 | Andreas | June 11, 1935 |
| 2,022,867 | Middleboe | Dec. 3, 1935 |
| 2,171,130 | Merrifield | Aug. 29, 1939 |
| 2,193,709 | Bottger | Mar. 12, 1940 |
| 2,282,199 | Neuman | May 5, 1942 |
| 2,293,686 | Allen | Aug. 18, 1942 |
| 2,376,810 | Richardson | May 22, 1945 |
| 2,544,210 | Zenke et al. | Mar. 6, 1951 |
| 2,703,671 | Kindseth | Mar. 8, 1955 |